United States Patent
Demmer et al.

(10) Patent No.: US 11,757,809 B2
(45) Date of Patent: Sep. 12, 2023

(54) INTEGRATING EXTERNAL CONTACTS IN A COMMUNICATION PLATFORM

(71) Applicant: Salesforce, Inc., San Francisco, CA (US)

(72) Inventors: Michael Demmer, San Francisco, CA (US); Kevin Marshall, San Francisco, CA (US); Pranay Agarwal, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1 day.

(21) Appl. No.: 17/239,311

(22) Filed: Apr. 23, 2021

(65) Prior Publication Data

US 2022/0345426 A1    Oct. 27, 2022

(51) Int. Cl.
*H04L 51/04*     (2022.01)
*H04L 67/306*    (2022.01)
*H04L 65/1066*   (2022.01)
*H04L 51/216*    (2022.01)

(52) U.S. Cl.
CPC .......... *H04L 51/04* (2013.01); *H04L 51/216* (2022.05); *H04L 65/1066* (2013.01); *H04L 67/306* (2013.01)

(58) Field of Classification Search
CPC ... H04L 51/04; H04L 65/1066; H04L 67/306; H04L 51/216; H04I 51/16
See application file for complete search history.

(56) References Cited

U.S. PATENT DOCUMENTS

| 7,275,215 B2* | 9/2007 | Werndorfer | G06F 3/167 715/752 |
| 9,681,099 B1* | 6/2017 | Deets, Jr. | H04L 51/32 |
| 2010/0250592 A1* | 9/2010 | Paquet | G06Q 10/10 707/770 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-Jefeat.html> 12 pages. (dated May 28, 2014, 2:48 PM) 8 pages.

(Continued)

*Primary Examiner* — Ryan J Jakovac
(74) *Attorney, Agent, or Firm* — Lee & Hayes, P.C.

(57) ABSTRACT

Techniques for enabling access to external data of a user for facilitating communications via a communication platform are described herein. A user of the communication platform maintains external data with a third-party service provider. The communication platform receives, in association with a user account of the user, an indication of intent to grant the communication platform access to the external data and an authorization code (the "code"). The communication platform later receives, from the first user account, a request to access the external data. For example, the request can include an input corresponding to an intended recipient of a message. In response to the input, the communication platform sends a request, with the code, to the third-party service provider to obtain contact data associated with the intended recipient and causes the contact data to be presented in association with the message, such as in a "To" field of the message.

20 Claims, 9 Drawing Sheets

(56) References Cited

U.S. PATENT DOCUMENTS

| | | | | |
|---|---|---|---|---|
| 2015/0237029 | A1* | 8/2015 | Zhang | H04L 65/403 |
| | | | | 726/6 |
| 2018/0176160 | A1* | 6/2018 | Steller | H04L 67/1095 |
| 2018/0287982 | A1 | 10/2018 | Draeger et al. | |
| 2021/0105242 | A1* | 4/2021 | Babayeva | H04L 67/34 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/2 context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

Ernie Smith, "Picking Up The Slack", Tedium, [onlinel][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83//8c8-09c8-43aa-9ba0-88526283de69/?context= 1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

INTEGRATING EXTERNAL CONTACTS IN A COMMUNICATION PLATFORM

TECHNICAL FIELD

Communication platforms are becoming increasingly more popular for facilitating work-related communications, such as for project collaboration within a single organization and across two or more organizations. To facilitate communications, the communication platform stores contact lists associated with each user, such as lists of other users with whom each user is connected. A user can initiate a message to another user by typing in a portion of the other user's name. The communication platform identifies the portion of the other user's name as being associated with the contact list of the user and populates recipient information in association with the "To" line of the message. However, if the intended recipient is not identified as being associated with the contact list of the user, the user may have to input full contact information associated with the intended recipient, such as an email address, phone number, or other identifying information. The entry of the full contact information is cumbersome and time consuming for the user.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
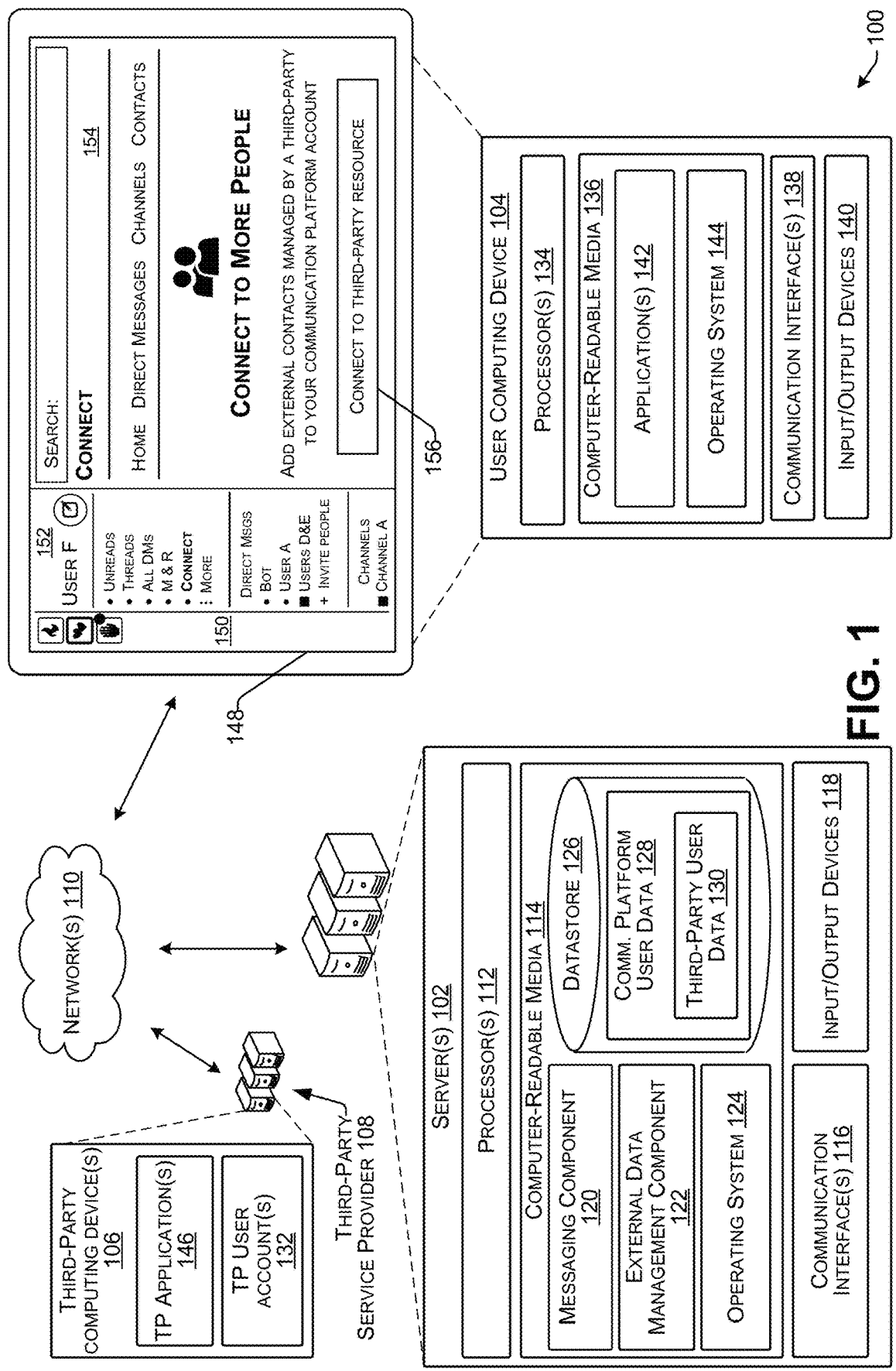
FIG. 1 illustrates an example system for performing techniques described herein.

Techniques for accessing an external contact list of a user for facilitating communications via a communication platform are described herein. The communication platform can be a group-based communication platform, a channel-based messaging platform and/or any other platform for facilitating communication between and among users. In an example, a first user of a first organization can utilize communication services available via the communication platform to communicate with other users of the first organization, as well as one or more users associated with other organizations with whom the first user has an established connection (e.g., in a contact list of the communication platform, previously communicated via a communication channel, direct messaging instance, in a social network, etc.). In addition to contacts of the first user that are maintained by the communication platform, the first user can maintain a personalized data resource with a third-party service provider (e.g., third-party resource), such as a personalized contact list, calendar, or the like that includes data associated with additional contacts. For example, the first user can maintain a centralized contacts list with a third-party service provider that includes contact data associated with personal and professional contacts of the first user.

In existing technologies, the personalized data resource can be stored in association with a third-party service provider and therefore not be accessible to a communication platform. As such, the communication platform can be configured to expedite communications between the first user and other users associated with a contact list maintained by the communication platform, but not with other contacts, such as those associated with the personalized data resource. For example, in existing technologies, a communication platform can be configured to receive, from the first user via a messaging interface, a portion of a recipient identifier (e.g., real name, username, handle, email address, etc.). Based on the portion of the recipient identifier, the communication platform can identify one or more potential recipients by comparing the portion of the recipient identifier with a contact list maintained by the communication platform. However, if the first user intends to send a message to an external contact (e.g., a second user associated with a personalized data resource maintained by a third-party service provider) and not associated with the contact list maintained by the communication platform, the communication platform may not recognize the recipient identifier and can request that the first user input additional recipient information, such as an email address, phone number, or other identifying information. This additional request for information can be cumbersome for the first user and can slow and potentially even hinder communications between the first user and the second user.

Techniques described herein are directed to enabling the communication platform access to a personalized data resource maintained by a third-party service provider. In at least one examples, the personalized data resource can include contact data associated with a plurality of contacts associated with one or more organizations that are different from an organization of the first user. In various examples, the first user can initiate a process to enable the communication platform to access the personalized data resource stored in association with a third-party service provider, such as by inputting an indication of intent to authorize access via an interface of the communication platform. For example, the first user can select a selectable option to connect the personalized data resource managed by a third-party service provider with the communication platform. In some examples, the indication of intent to authorize access via the interface can include an authorization token associated with the third-party service provider. In such examples, the first user can provide authorization to the communication platform to access data stored in association with the third-party service provider.

In response to receiving the indication of intent, the communication platform can obtain the data (e.g., contact data) from the third-party service provider. In various examples, the first user can provide indications of intent to authorize the communication platform access to data stored in association with two or more different third-party service providers. In such examples, the communication platform can obtain the data from each of the two or more different third-party service providers, such as to render associated contact data accessible via the interface of the communication platform.

In various examples, the communication platform can obtain the data from the third-party service provider(s) utilizing a code or a token associated with the first user and/or a respective third-party service provider. In some examples, the communication platform can receive, from the first user computing device, a first request to obtain the data stored in association with one or more third-party service provider(s). In some examples, the first request can include an express request to access external data (e.g., data associated with users of different organizations, data stored in association with the one or more third-party service providers, etc.). For example, the first user can submit a first request for the communication platform to download an external contact list stored by a third-party service provider. In response to receiving the express request, the communication platform can obtain the data stored by the third-party service provider, such as utilizing a code or a token associated therewith.

In some examples, the first request can include an implied request to access the data. In such examples, the communication platform can obtain and/or access the data stored by the third-party service provider responsive to receiving the implied request. The implied request can be associated with initiating a message to a contact, conducting a search for information, or the like. For example, the first user can input a portion of a user identifier (e.g., username, real name, email address, organization, etc.) associated with an intended recipient of a message into a messaging interface of the communication platform (e.g., into a "To" field of the messaging interface). The communication platform can search a contact list of the first user managed by the communication platform (e.g., stored in association with a first user account) to determine whether the user identifier is associated with a contact stored in the contact list. Based on a determination that the user identifier is not associated with the contact list associated with the first user account, the communication platform can identify an implied request to access data stored in association with the third-party service provider.

In various examples, based on the first request (e.g., express, implied, etc.) to access the data, the communication platform can send a second request to the third-party service provider to access and/or obtain the data. In various examples, the second request can include the code provided to the communication platform by the first user and/or the third-party service provider. As discussed above, the second request can include an API call including the code. Continuing the example from above, the communication platform can receive, from the first user computing device via the messaging interface, the portion of the user identifier. Responsive to determining that the user identifier is not associated with the contact list corresponding to the first user account, the communication platform can send a second request to the third-party service provider to access a personalized data resource stored in association with the third-party service provider. The second request can include the portion of the user identifier, the code, and/or other information associated with the first user that can be used to facilitate the access to the data.

Based on the second request, the communication platform can receive the data from the third-party service provider. In some examples, the portion of the data can include the data requested in the express or implied request. In various examples, the communication platform can be configured to cause the portion of the data to be presented to the first user via the interface of the first user computing device. For example, the first user can expressly request to import a personalized data resource stored in association with a third-party service provider. The communication platform can send the second request to the third-party service provider to obtain the data and responsive to receipt, can cause the data to be presented on the first user computing device. For another example, continuing the example from above of the implied request to access contact information associated with a portion of a user identifier, the communication platform can identify and/or receive one or more contacts that substantially match the portion of the user identifier (e.g., share 50%, 75%, etc. of the characters). The communication platform can cause the one or more contacts to be presented via the interface. In such an example, the communication platform can be configured to automatically populate the messaging interface (e.g., the "To" field of the messaging interface) with a user identifier associated with an external contact (e.g., a contact associated with a personalized data resource stored in association with a third-party service provider). Accordingly, the communication platform can be configured to facilitate expedited communications between the first user and a plurality of contacts of the first user, regardless of where contact information of the plurality of contacts is stored.

From the user experience perspective, techniques described herein greatly enhance the ease of communication between users of different organizations. As discussed above, the communication platform can be configured to access external contact lists and other information associated with a particular user, such as to enable the particular user to communicate with a greater number of people via the communication platform. The increased ability to communicate via the communication platform can reduce a need for the user to rely on different methods of communication, such as email, texting, and the like. By centralizing communications within the communication platform, the techniques described herein can reduce an amount of time and computing resources required to search for particular conversations sent via different methods of communication. Accordingly, the techniques described herein can reduce an amount of processing power and memory required to search for an identify particular conversations, thereby improving the performance of associated computing devices.

Additionally, oftentimes the other methods of communication, such as email and the like, store data remote from a user computing device, such as in association with a server computing device. Because much of the data is stored remotely, a user attempting to locate a particular email or communication with another user may utilize network bandwidth in the search. However, by maintaining centralized communications, the search can be expedited with less bandwidth used. Accordingly, the techniques described herein can increase an amount of network bandwidth available to other resources.

While the description above describes accessing a personalized data resource, such as an external contact via a group-based communication platform, techniques described herein can similarly be applicable to other data stored in association with a third-party resource, such as organizational data (e.g., organizational chart, organizational contacts, business type, etc.), social graphs (e.g., common connections, etc.), project data (e.g., working relationships, project groups, etc.), sales data (e.g., previous purchases, tiered status, etc.), and the like. For example, a user of a first organization can enable a communication platform to access organizational data associated with an organization stored by a third-party service provider, such as a hierarchical structure of the organization. Another user of the organization can request to access the particular organizational data. Responsive to the request, the communication platform can obtain the particular organizational data from the third-party service provider. As such, techniques described herein are not limited to external contact lists being accessible to the communication platform.

Additionally, while the description describes accessing personalized data resources associated with a particular user, techniques described herein can similarly be applicable data stored in association with to other groups, such as workspaces that include users from different organizations. For example, a first group of users associated with a first workspace can store data via a third-party data resource, such as data associated with a project. A user of the first group of users can grant the communication platform access to the data stored in association with the third-party service provider. Responsive to a request to share the data with a second group of users associated with a second workspace, the communication platform can obtain the data and provide the data to the second group of users via the communication platform. Accordingly, the techniques described herein can further be used to facilitate data sharing and collaboration between different groups of users. Additional details and examples are described below with reference to FIGS. 1-8.

FIG. 1 illustrates an example system 100 for performing techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In various examples, each group can be associated with a workspace, enabling users associated with the group to chat, meet, call, collaborate, transfer files or other data, or otherwise communicate between or among each other in a secure and private virtual space. In some examples, members of a group, and thus a workspace, can be associated with a same organization. In some examples, members of a group, and thus a workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 and/or one or more third-party computing devices 106 associated with a third-party service provider 108 (e.g., third-party resource) via one or more network(s) 110. That is, the server(s) 102, the user computing device 104, and the third-party computing device(s) 106 can transmit, receive, and/or store data (e.g., content, information, or the like) using the network(s) 110, as described herein. The user computing device 104 and the third-party computing device(s) 106 can be any suitable type of computing device, e.g., portable, semi-portable, semi-stationary, or stationary. Some examples of the third-party computing device(s) 106 can include a server computing device, such as that described above with regard to the server(s) 102, a desktop computing device, a terminal computing device, or the like.

Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 110 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 110 are well known and are not discussed herein in detail.

In at least one example, the server(s) 102 can include one or more processors 112, computer-readable media 114, one or more communication interfaces 116, and input/output devices 118. Though not illustrated in FIG. 1, the third-party computing device(s) 106 can additionally include one or more processors, such as processor(s) 112, computer-readable media, such as computer-readable media 114, communication interface(s) 116, such as communication interface(s) 116, input/output devices, such as input/output devices 118.

In at least one example, each processor of the processor(s) 112 can be a single processing unit or multiple processing units and can include single or multiple computing units or multiple processing cores. The processor(s) 112 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 112 can be one or more hardware processors and/or logic circuits of any suitable type specifically programmed or configured to execute the algorithms and processes described herein. The processor(s) 112 can be configured to fetch and execute computer-readable instructions stored in the computer-readable media, which can program the processor(s) to perform the functions described herein.

The computer-readable media 114 can include volatile and nonvolatile memory and/or removable and non-removable media implemented in any type of technology for storage of data, such as computer-readable instructions, data structures, program modules, or other data. Such computer-readable media 114 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 114 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 114 can be used to store any number of functional components that are executable by the processor(s) 112. In many implementations, these functional components comprise instructions or programs that are executable by the processor(s) 112 and that, when executed, specifically configure the processor(s) 112 to perform the actions attributed above to the server(s) 102. Functional components stored in the computer-readable media can optionally include a messaging component 120, an external data management component 122, an operating system 124, and a datastore 126.

In at least one example, the messaging component 120 can process messages between users. That is, in at least one example, the messaging component 120 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. The communication channel, or virtual space, can be a data route used for exchanging data between and among systems and devices associated with the communication platform. In at least one example, the messaging component 120 can establish a communication channel between and among various user computing devices, allowing the user computing devices to communicate and share data between and among each other. In at least one example, the messaging component 120 can manage such communications and/or sharing of data. In some examples, data associated with a communication channel can be presented via a user interface.

In various examples, the messaging component 120 can receive a portion of a user identifier (e.g., username, real name, email address, phone number, etc.) associated with a recipient of a message from a user computing device 104 associated with an originator of the message (e.g., a sending user). The portion of the user identifier can include one or more characters, numbers, symbols, or the like that are used to identify a particular user account (e.g., recipient user account). For example, the portion of the user identifier can be received via a "To" field of a messaging interface associated with the user computing device 104. In some examples, the messaging component 120 can be configured to identify one or more user accounts of the communication platform that are associated with the portion of the user identifier. In some examples, the messaging component 120 can identify the user account(s) based on a comparison with the portion of the user identifier to a communication platform contact list stored in association with the sending user. The communication platform contact list can include a list of contacts associated with the sending user that is stored and/or managed by the communication platform, such as in communication platform user data 128 in association with a user account corresponding to the sending user. The communication platform contact list can include other users associated with a same organization as the sending user. In some examples, the communication platform contact list can include other users that are associated with another organization that is different from the organization of the sending user. In such examples, the other users can include users with whom the sending user has an established relationship (e.g., has previously communicated with or otherwise connected to) in association with the communication platform.

In various examples, responsive to determining a substantial match (e.g., 80%, 90% character match) between the portion of the user identifier and one or more user identifiers associated with user account(s), the messaging component 120 can cause the user identifier(s) to be presented via the messaging interface, such as in a list of potential recipients. In some examples, responsive to determining a substantial match between the portion of the user identifier and a particular user identifier associated with a particular user account, the messaging component 120 can cause the particular user identifier to be automatically populated in the "To" field of the messaging platform.

In various examples, the messaging component 120 can receive the portion of the user identifier and can determine that the intended recipient is not associated with the communication platform contact list of the sending user. In various examples, the messaging component 120 can determine whether the user account of the sending user has associated therewith an external contacts list (e.g., personalized data resource managed by a third-party service provider 108). In various examples, the messaging component 120 can be configured to identify whether the user account of the sending user has an associated external contacts list based on third-party user data 130 stored in association with the user account. The third-party user data 130 can include a code associated with accessing third-party data stored in association with a third-party service provider 108, an identification of the third-party service provider 108, credential data associated with the third-party service provider 108 (e.g., username, password, etc.) a description of the data (e.g., external contacts list, organizational data, sales data, etc.), instructions associated with requesting access to the data (e.g., include code, credentials, a real name of the user (e.g., sending user), etc.), user-provided instructions associated with accessing data (e.g., access data in association with messaging interface, access data based on express request, access data based on implied request, etc.).

Figure 3A:
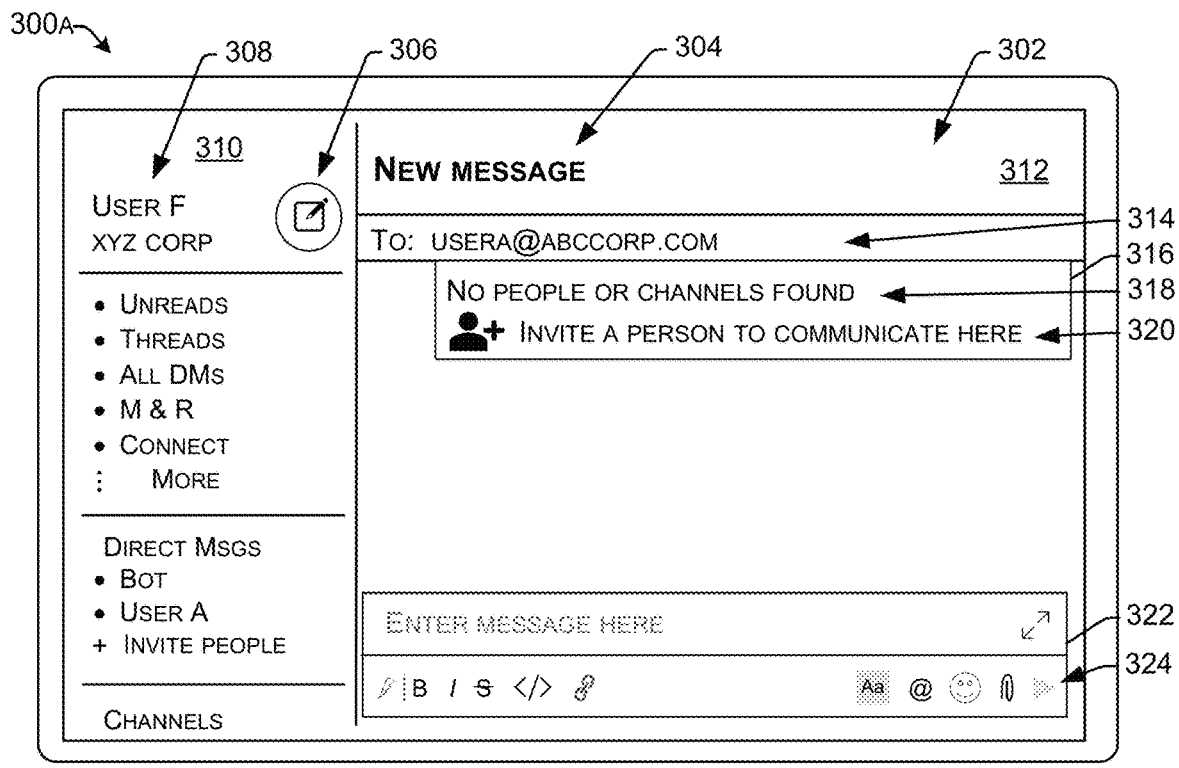
FIGS. 3A-3D illustrate example user interfaces for enabling access to contact data stored in association with a third-party resource, as described herein.

Based on a determination that the user account does not have an associated external contacts list, the communication platform can cause an indication that no contacts associated with the portion of the user identifier were identified, such as that illustrated in FIG. 3A. In some examples, the communication platform can additionally cause a selectable option to be presented via the messaging interface that enables the user to invite the intended recipient to communicate via the communication platform. In some examples, the communication platform can cause the indication that no contacts associated with the portion of the user identifier were identified based on a determination that an instruction associated with accessing the data did not permit access to data in the particular scenario (e.g., when inputting an identifier associated with an intended recipient into a particular message). For example, the instruction can include an instruction to not permit access external data in association with a particular workspace. Based on a determination that the originating user operating within the particular workspace, the communication platform can present the indication that the data was not identified.

Based on a determination that the user account does have an associated external contacts list, the external data management component 122 can send a request to access and/or obtain the data from an associated third-party service provider 108. In various examples, the request can include a code provided to the communication platform by the user. The code can include a token or other secure identification code used to authenticate with the third-party service provider. The code can be configured to be a code of unlimited duration (e.g., no expiration, perpetual code) or of limited duration (e.g., limited time during which the code is valid). In some examples, external data management component 122 can send the request with the code in an application programming interface (API) call, to access and/or obtain data stored in association with the third-party service provider 108. In various examples, the external data management component 122 can include additional or alternative data in the request, such as data associated with the sending user, information regarding a type of data requested, and the like. For example, the external data management component 122 can send a request with the code and the portion of the user identifier for searching an external contact list associated with the third-party service provider 108.

In some examples, the external data management component 122 can determine the data to include in the request based at least in part on instructions stored in the third-party user data 130. For example, an instruction to request data can include an instruction to include credentialing information associated with the sending user, to assist in further authenticating the request and/or verifying the data to be accessed and/or obtained. In some examples, the external data management component 122 can be configured to periodically (e.g., daily, weekly, etc.) request to obtain data associated with the sending user from the third-party service provider 108. In such examples, the external data management component 122 can be configured to maintain updated third-party data associated with the sending user. In various examples, the external data management component 122 can store the updated data in the user account of the sending user, such as in third-party data 130. In such examples, the messaging component 120 can be configured to access the third-party data 130 to identify an intended recipient based on the portion of the user identifier, such as by determining the substantial match between the portion of the user identifier and one or more user identifiers associated with the third-party data 130. The messaging component 120 can then cause the user identifier(s) to be presented via the messaging interface, such as in a list of potential recipients.

In some examples, responsive to receiving the request, the third-party computing device(s) 106 can authenticate the request based at least in part on the code and/or other data included in the request. As a non-limiting example, the code can include a token associated with the sending user and generated to enable the communication platform access to data stored by the third-party service provider 108. Based on verifying the token, the third-party computing device(s) 106 can authenticate the request. In some examples, the third-party computing device(s) 106 can identify a third-party user account 132 associated with the sending user. In such examples, the third-party computing device(s) 106 can authenticate based at least in part on the third-party user account 132.

In some examples, in response to authenticating the third-party computing device(s) 106 can identify particular data associated with the request. In some examples, the particular data can be included in the request. As will be discussed in further detail below, the particular data can be designated by the sending user when requesting the code from the third-party service provider 108. For example, the sending user can submit a request to the third-party service provider 108 for a token to enable the communication platform access to data. The request can include an indication of the particular data that the sending user grants the communication platform access to.

In various examples, the third-party computing device(s) 106 can send the particular data to the communication platform (e.g., to server(s) 102) based on the request to access and/or obtain data. For example, the request can include the portion of the user identifier associated with the intended recipient. The third-party computing device(s) 106 can identify one or more contacts associated with the portion of the user identifier (e.g., contact(s) that substantially match), such as in a personalized data resource of the sending user. The third-party computing device(s) 106 can send the contact(s) and/or information associated therewith (e.g., email address, user handle, etc.) to the communication platform.

In some examples, the third-party computing device(s) 106 can grant the external data management component 122 access to at least a portion of the data stored in association with a third-party user account 132 of the sending user. In such examples, the external data management component 122 can be configured to search the personalized data resource to identify the contact(s) that substantially match the portion of the user identifier. The external data management component 122 can obtain the data (e.g., contact(s)) and can cause the data to be presented via an interface of the user computing device 104. In some examples, the external data management component 122 can store the data as third-party user data 130 associated with a user account of the sending user. In some examples, the external data management component 122 can provide the data to the messaging component 120 for displaying via the messaging interface.

In various examples, the messaging component 120 can determine that the data includes a single recipient identifier. In such examples, the single recipient identifier can represent a single contact that substantially matches the portion of the user identifier. In some examples, the messaging component 120 can be configured to automatically populate a "To" field of the messaging interface with the single recipient identifier. In some examples, the messaging component 120 can cause the single recipient identifier to be presented in a list of selectable options for message addressing. In such examples, the messaging component 120 can enable the sending user to select the single recipient identifier based on a determination that the single recipient identifier is associated with an intended recipient, or continue inputting additional characters, symbols, numbers, or the like usable to identify the intended recipient and/or contact information associated therewith (e.g., email address, telephone number, etc.).

In some examples, the messaging component 120 can determine that the data includes two or more recipient identifiers. In such examples, the two or more recipient identifiers can represent two or more contacts that substantially match the portion of the user identifier. For example, the portion of the user identifier can include a name of a corporation, such as ABC Corp, and the data can include two or more contacts stored in the communication platform contacts list and/or the external contacts list. The messaging component 120 can cause a list of the two or more contacts associated with ABC Corp. to be presented in association with the "To" field of the messaging interface, such as to enable the sending user to select the intended recipient from the list.

In various examples, the messaging component 120 can receive the input via the "To" field and can determine the intended recipient of the message. In some examples, the messaging component 120 can be configured to identify a communication platform user account associated with the intended recipient, such as that stored in the communication platform user data 128. In various examples, responsive to receiving an indication that the sending user submits a request to send the message, the messaging component 120 can deliver the message to the intended recipient based at least in part on the communication platform user account. As an illustrative example, the messaging component 120 can send the message via a direct messaging instance between the sending user and the intended recipient. In some examples, the messaging component 120 can determine that the intended recipient is not associated with the communication platform. In such examples, the messaging component 120 can be configured to deliver the message via an alternative means, such as via email, text message, or the like. In various examples, the messaging component 120 can determine the alternative means based on the recipient identifier included in the "To" field. For example, based on a determination that the recipient identifier includes an email address, the messaging component 120 can send the message via email. In various examples, the messaging component 120 can utilize an API or other programming interface to cause the message to be delivered to a particular email host. For another example, based on a determination that the recipient identifier includes a telephone number, the messaging component 120 can send the message via short message system (e.g., text message) or can coordinate with a telephone service provider to generate an automated voicemail.

In various examples, the messaging component 120 can store messages sent between user computing devices in the datastore 126, such as in organization data and/or in additional data. In some examples, the messages can be stored in the communication platform user data 128. In at least one example, the datastore 126 can be configured to store data that is accessible, downloadable, manageable, and updatable. In some examples, the datastore 126 can be integrated with the server(s) 102, as shown in FIG. 1. In other examples, the datastore 126 can be located remotely from the server(s) 102 and can be accessible to the server(s) 102 and/or user computing device(s), such as the user computing device 104. Additional or alternative data can be stored in the datastore 126 and/or in one or more other data stores.

In some examples, the datastore 126 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, organization data stored in the datastore 126 can include discrete shards for each individual organization, including data related to a particular organization identification. For example, a database shard can store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual users can be associated with a database shard within the datastore 126 that stores data related to a particular user account. For example, communication platform user data 128 associated with a particular user account can be stored in a particular database shard. In some examples, third-party user data 130 associated with a particular user account can be associated with a database shard within the datastore 126. For example, a personalized data resource or portion thereof obtained from a third-party service provider 108 can be associated with a database shard within the datastore 126.

In at least one example, the operating system 124 can manage the processor(s) 112, computer-readable media 114, and/or hardware, software, etc. of the server(s) 102.

The communication interface(s) 116 can include one or more interfaces and hardware components for enabling communication with various other devices (e.g., the user computing device 104, third-party computing device(s) 106, etc.), such as over the network(s) 110 or directly. In some examples, the communication interface(s) 116 can facilitate communication via Websockets, Application Programming Interfaces (APIs) (e.g., using API calls), HyperText Transfer Protocols (HTTPs), etc.

The server(s) 102 can further be equipped with various input/output devices 118 (e.g., I/O devices). Such I/O devices 118 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 112 and can be the same as or different than the processor(s) 112.

The computer-readable media 136 can comprise any of the types of computer-readable media 136 described above with reference to the computer-readable media 114 and can be the same as or different than the computer-readable media 114. Functional components stored in the computer-readable media can optionally include one or more applications 142 and an operating system 144.

The application(s) 142 can include a mobile application, a web application, and/or a desktop application. In some examples, one or more of the application(s) 142 can include third-party applications 146, which can be provided by the third-party service provider(s) 108. In at least one example, at least one application 142 can be provided by the communication platform or which can be an otherwise dedicated application. In some examples, individual user computing devices associated with the system 100 can have an instance or versioned instance of the application(s) 142, which can be downloaded from an application store, accessible via the Internet, or otherwise executable by the processor(s) 134 to perform operations as described herein. That is, the application(s) 142 can be an access point, enabling the user computing device 104 to interact with the server(s) 102 to access and/or use communication services available via the communication platform. In at least one example, the application(s) 142 can facilitate the exchange of data between and among various other user computing devices, for example via the server(s) 102. In at least one example, the application(s) 142 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 148 is shown in FIG. 1. As illustrated in FIG. 1, the user interface 148 can present data associated with the communication platform, such as via a communication platform application 142. In various examples, the user interface 148 can be configured to present data associated with one or more communication channels, one or more direct messages and, in some examples, one or more workspaces. That is, in some examples, the user interface 148 can present messages sent via one or more communication channels and/or via direct message(s) in a single user interface so that the user (e.g., of the user computing device 104) can access and/or interact with data associated with the multiple channels and/or direct messaging instances that he or she is associated with and/or otherwise communicate with other users associated with the multiple channels and/or direct messaging instances. The communication channels and/or direct messaging instances can be internal to an organization of the user or externally shared (e.g., include users from two or more organizations, include a first user from a first organization and second user not associated with an organization).

In some examples, the user interface 148 can include a first region 150, or pane, that includes indicator(s) (e.g., user interface element(s) or object(s)) associated with workspace(s) with which the user (e.g., account of the user) is associated. In some examples, the user interface 148 can include a second region 152, or pane, that includes indicator(s) (e.g., user interface element(s) or object(s)) representing data with which the user (e.g., account of the user) is associated. Additional details associated with the second region 152 and indicator(s) are described below with reference to FIG. 2.

In at least one example, the user interface 148 can include a third region 154, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 154 can be associated with the same or different workspaces. That is, in some examples, the third region 154 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 154 presents data associated with multiple workspaces, at least some data can be associated with an indication of which workspace the data is associated with. Additional details associated with the user interface 148, and the third region 154 operating as a messaging region or messaging interface, are described below with reference to FIGS. 3A, 3C, and 3D.

In the illustrative example, the third region 154 includes a connect interface via which a user of the user computing device 104 can connect with other users of different organizations. In at least one example, the connect interface can provide a means by which a user can expedite communications with users of other organizations, such as without requiring a burden of an administrative approval process. In some examples, the connect interface can provide a means by which a user can expedite communications with others whom the user is not currently connected.

In the illustrative example, the connect interface includes a connection selectable option 156, enabling the user to connect the communication platform with data stored in association with a third-party service provider 108. In some examples, responsive to receiving an indication of selection of the connection selectable option 156, the communication platform can request contacts from a third party service provider to be obtained or imported into the communication platform. In some embodiments, clicking the connection selectable option 156 causes a request for a code associated with accessing data maintained by the third-party service provider. In some examples, the request for the code can include a request for additional information, such as an identification of the third-party service provider 108, third-party user account credentials (e.g., username, password, etc.), or the like. In some examples, the request to obtain contact information from the third-party service uses an authentication process that first authenticates the user and ensures that the user can access the third-party service. Once the user is authenticated, a code or token may be generated to be used in obtaining the third-party data.

As discussed above, the code can include a token or other secure identification code used to authenticate with the third-party service provider 108. In various examples, responsive to receiving the indication of selection of the connection selectable option 156 and/or an indication of the third-party service provider 108 associated with the connection, the communication platform can cause another application 142 to launch on the user computing device 104, such as an instance of a third-party application 146. In various examples, the communication platform can cause the other application 142 to launch in association with a request to receive a code from the third-party service provider 108. In such examples, the communication platform can enable the user to easily request a code from the third-party service provider 108.

In various examples, the user can submit a request for a code via the instance of the third-party application 146, such as that facilitated by the communication platform. Responsive to third-party authentication of the request, the third-party computing device(s) 106 can send the code to the user computing device 104. As will be discussed below in greater detail, the connect interface can provide a means by which the user can provide the code to the communication platform. Responsive to receiving the code, the communication platform can store the code in association with the user account of the user. In various examples, the communication platform can utilize the code to access data stored by the third-party service provider 108, such as that described above with regard to an external contact list (e.g., personalized data resource).

In at least one example, the operating system 144 can manage the processor(s) 134, computer-readable media 136, hardware, software, etc. of the user computing device 104.

The communication interface(s) 138 can include one or more interfaces and hardware components for enabling communication with various other devices (e.g., the user computing device 104), such as over the network(s) 110 or directly. In some examples, the communication interface(s) 138 can facilitate communication via Websockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the application(s) 142, techniques described herein can be performed by any other component, or combination of components, which can be associated with the server(s) 102, the user computing device 104, or a combination thereof.

Figure 2:
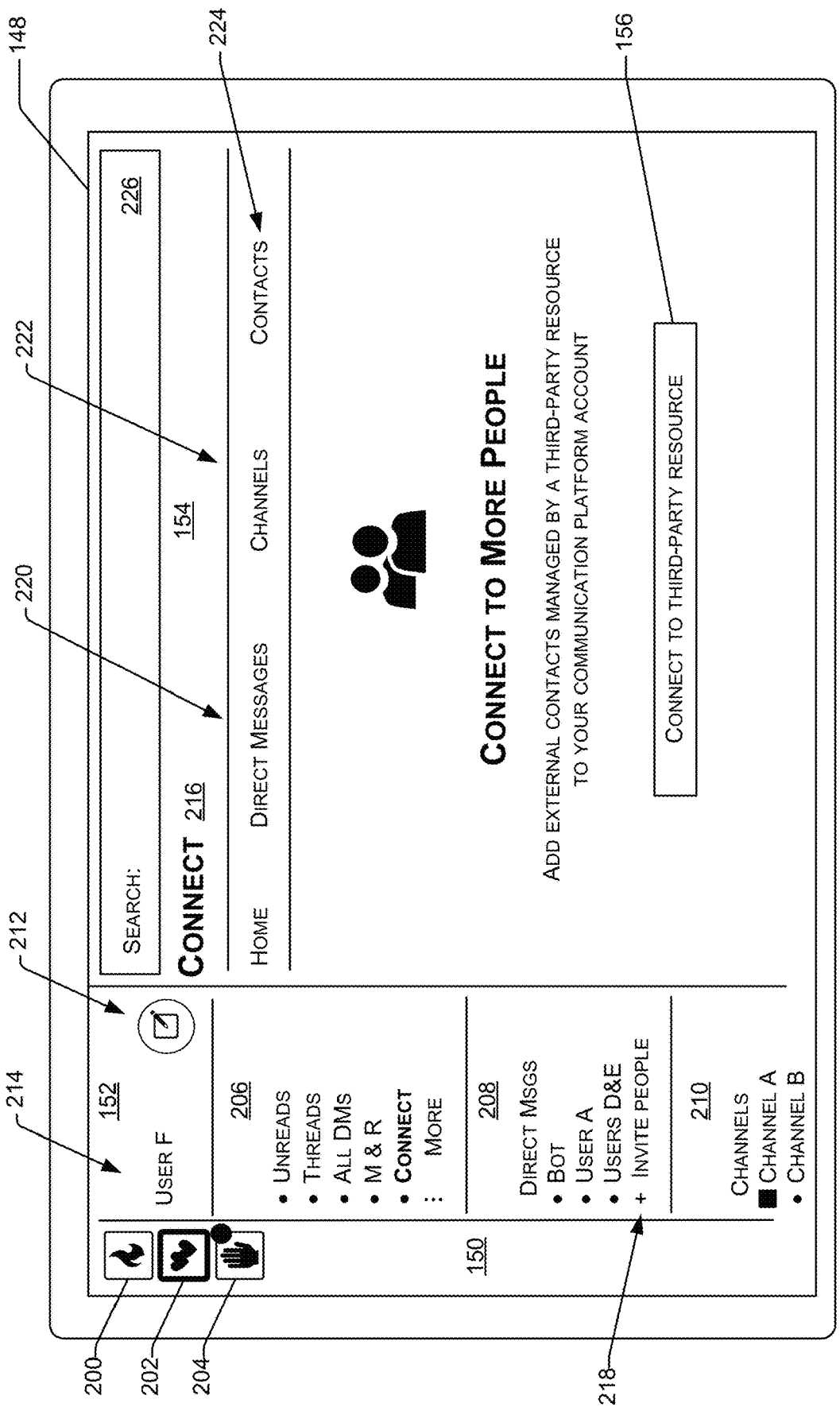
FIG. 2 illustrates an example user interface for enabling access to data stored in association with a third-party service provider, as described herein.

FIG. 2 illustrates additional details associated with the user interface 148 that presents data associated with a connect interface, as described above with reference to FIG. 1.

As described above, in at least one example, the user interface 148 can include a first region 150, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 150. In at least one example, a user account of the user (e.g., User F) can be associated with group identifiers that correspond to each of the workspaces (e.g., as determined by the communication platform user data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indicators described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 150. In some examples, some of the indicators associated with all of the workspaces with which a user is associated can be presented via the first region 150 and the user can interact with the user interface 148 to view additional or alternative indicators. In examples where fewer than all workspaces are represented via the user interface 148, the indicators can be arranged in alphabetical order, in an order of most recent interaction, in an order based on most frequent interaction, or some other order.

In some examples, the first region 150 may not be included in the user interface 148, and such information can be integrated into the user interface 148 via additional or alternative mechanisms.

In some examples, the user interface 148 can include a second region 152, or pane, that includes indicator(s) (e.g., user interface element(s) or object(s)) representing virtual space(s) associated with the workspace(s) with which the user (e.g., account of the user) is associated. In the illustrative example, the second region 152 can include a compose selectable option 212 that enables a user 214 (e.g., User F) to compose a message to another user. For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message can include any text, image, video, audio, or combination thereof provided by a user (using a user computing device). For instance, the user can provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers can comprise American Standard Code for Information Interchange (ASCII) text, a pointer, a memory address, or the like.

In at least one example, the second region 152 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause one of the one or more application(s) 142 (e.g., a communication platform application) to present data associated with the corresponding virtual space via the third region 154. In some examples, a virtual space can be associated with all unread data associated with each of the workspaces with which the user is associated. That is, in some examples, if the user requests to access the virtual space associated with "unreads," all data that has not been read (e.g., viewed) by the user can be presented in the third region 154, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, a virtual space can be associated with expediting communications between a user 214 of an organization and other users associated with other organizations that are different from the organization of the user 214 (illustrated as a select icon) and/or individual accounts, such as those associated with user accounts that do not have an associated organization. For example, "connect" can be associated with enabling expedited communications with users of other organizations. In some examples, the "connect" virtual space can be associated with one or more channels and/or direct messaging instances that include a user from at least one other organization. In such examples, responsive to receiving a selection of the "connect" indicator in the first sub-section 206, the communication platform can cause a presentation of the one or more channels and/or direct messaging instances in the second region 152, such as in the first sub-section 206. As will be discussed in greater detail below, in at least one example, responsive to receiving an indication of selection of the "connect" indicator, the communication platform can cause a connect interface 216 to be presented in the third region 154.

In at least one example, the second region 152 of the user interface 148 can include a second sub-section 208, or sub-pane, that includes include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users (e.g., direct messaging instances).

In the illustrative example, the second sub-section 208 includes an invite selectable option 218 that enables the user 214 to invite other users to communicate via a direct messaging instance. Responsive to receiving an indication of selection of the invite selectable option 218, the communication platform can launch an interface for generating an invitation to communicate via direct message. In some examples, the communication platform can send the invitation to an identified user, such as based on a user identifier or other contact information. In response to receiving an indication of acceptance of the invitation, the communication platform can generate a new direct messaging instance and provide an indicator thereof in the second sub-section 208.

In addition to the second sub-section 208, the second region 152 can include a third sub-section 210, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user can be associated with both workspaces, or can only be associated with one of the workspaces. In some examples, the communication channels represented can be associated with combinations of communication channels associated with a single workspace and communication channels associated with different workspaces.

In some examples, the third sub-section 210 can depict all communication channels, or a subset of all communication channels, that the user has permission to access (e.g., as determined by the permission data stored in association with communication platform user data 128). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the third sub-section 210 can depict all communication channels, or a subset of all communication channels, that the user is a member of, and the user can interact with the user interface 148 to browse or view other communication channels that the user is not a member of but are not currently displayed in the third sub-section 210. In some examples, different types of communication channels (e.g., public, private, shared, cross-workspace, etc.) can be in different sections of the third sub-section 210, or can have their own sub-regions or sub-panes in the user interface 148. For example, as described above, shared channels can be presented in association with the "connect" indicator illustrated in the first sub-section 206. In some examples, communication channels associated with different workspaces can be in different sections of the third sub-section 210, or can have their own regions or panes in the user interface 148.

In some examples, the indicators can be associated with graphical elements that visually differentiate types of communication channels. For example, Channel A is associated with a square visual element instead of a circle visual element. As a non-limiting example, and for the purpose of this discussion, the square visual element can indicate that the user is not a current member of Channel A, whereas the circle visual element can indicate that the user is a current member of Channel B. In some examples, additional or alternative graphical elements can be used to differentiate between public communication channels, private communication channels, shared communication channels, communication channels associated with different workspaces, and the like. In other examples, communication channels that the user is not a current member of may not be displayed in the third sub-section 210 of the user interface 148. In such examples, the user can navigate to a different interface (not shown) to browse additional channels that are accessible to the user but to which the user is not currently a member.

As described above, in at least one example, the user interface 148 can include a third region 154, or pane, for presenting data associated with the communication platform, such as data associated with one or more communication channels, direct messaging instances, workspaces, and/or one or more external connections. In at least one example, the third region 154 can present data that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 154 can be associated with a connect interface 216. That is, in some examples, the third region 154 can present data associated with connecting to and/or viewing current connections (e.g., direct messaging instances and/or communication channels) that include at least one user from another organization (e.g., organization that is different from an organization of the user) and/or an individual account that is not associated with an organization.

For example, in FIG. 2, the user 214 can interact with the user interface 148 to view data associated with the connect interface 216. In some examples, the connect interface 216 can provide a means by which the user 214 can expedite communications with others of other organizations and/or individual accounts whom the user is not currently connected. In some examples, the connect interface 216 can provide a means by which the user 214 can compose a message (e.g., direct message or in a channel) to another user that is not associated with the communication platform, such as via email, text message, or the like. For example, the connect interface 216 can include a direct messages selectable option 220 to enable the user 214 to view a list of direct messaging instances and/or generate new direct messaging instances between the user 214 and another user of a different organization and/or another user associated with an individual account. For another example, the connect interface 216 can include a channels selectable option 222 configured to enable the user 214 to view a list of communication channels and/or generate new channels between the user 214 and another user outside of an organization of the user 214.

In FIG. 2, the connect interface 216 includes a contacts selectable option 224 configured for enabling the communication platform to access data associated with the user 214 (e.g., third-party user data) that is stored in association with a third-party service provider, such as third-party service provider 108. In the illustrative example, the third-party user data can include an external contacts list that is maintained by the third-party service provider. In other examples, the third-party data can include other data, such as documents, files, photos, or the like. In such examples, the connect interface 216 can include additional or alternative selectable options associate with different types of third-party data to be accessible to the communication platform. For example, the connect interface 216 can include a "photos" selectable option to enable access to externally stored photographs of the user, a "shared docs" selectable option to enable access to externally shared and/or sharable documents (e.g., for collaboration on the documents), and the like.

In response to receiving an indication of selection of the contacts selectable option 224, the communication platform can cause the connection selectable option 156 to be presented via the connect interface 216. The connection selectable option 156 can initiate a process of enabling the communication platform access to the third-party user data, such as that described above and below.

In various examples, additional or alternative data can be presented via the third region 154 of the user interface 148. For example, non-limiting examples of additional data that can be presented via the third region 154 include a feed associated with one or more communication channels and/or one or more direct messaging instances, members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.). In at least one example, the format of the individual communication channels or virtual spaces can appear differently to different users, such as based on organizations associated therewith. For example, a format of an individual communication can include one or more indicators of one or more organizations with whom users of the individual communication channel is associated. In some examples, the format of the individual communication channels or virtual spaces can appear differently based on which workspace a user is currently interacting with or most recently interacted with. In some examples, the format of the individual communication channels or virtual spaces can appear differently for different users (e.g., based on personal configurations, group membership, etc.).

In at least one example, the user interface 148 can include a search mechanism 226, wherein a user can input a search term and the server(s) 102 can perform a search associated with the communication platform. In some examples, the search can be performed across each workspace with which the user is associated, or the search can be restricted to a particular workspace, based on a user specification.

The user interface 148 is a non-limiting example of a user interface that can be presented via the user computing device 104 (e.g., by one of the one or more applications 142). In some examples, the application 142 can receive data from the messaging component 120, the external data management component 122, and/or a third-party computing device(s) 106 (e.g., third-party application 146, third-party data associated with a third-party user account 132, etc.), and can generate and present the user interface 148 based on the data. In other examples, the application 142 can receive the data and instructions for generating the user interface 148 from the messaging component 120 and/or external data management component 122. In such an example, the application 142 can present the user interface 148 based on the instructions. Additional or alternative data can be presented via a user interface and additional or alternative configurations can be imagined.

FIG. 3A-FIG. 4B are schematic views showing example user interfaces that are usable to implement the techniques described herein for enabling access to data stored in association with a third-party service provider. The interfaces can be generated by a computing device of a communication platform (e.g., server(s) 102) and transmitted to one or more user computing devices (e.g., user computing device(s) 104) for presentation. Additionally or alternatively, the interfaces can be generated by the user computing device(s) and/or the third-party service provider computing device(s) based at least in part on instructions received from the communication platform. The interfaces illustrated in FIGS. 3A-4C may, but need not, be implemented in the context of the system 100.

FIGS. 3A-3D illustrate an example user interface for enabling access to contact data stored in association with a third-party resource, as described herein. The interfaces 300A, 300B, 300C and/or 300D can be associated with a user computing device, such as user computing device 104. Interface 300A shown in FIG. 3A illustrates a messaging pane 302 associated with a new message 304. In various examples, the communication platform can cause the messaging pane 302 to be presented responsive to receiving an indication of selection of a compose selectable option 306, such as compose selectable option 212, associated with and usable to initiate message composition. In such examples, the compose selectable option 306 can enable a user 308 (e.g., User F) to generate a new message to another user. In the illustrative example of FIG. 3A, the compose selectable option 306 is presented in a first section 310 (or region) of the interface 300A, similar to the second region 152 of user interface 148 and the messaging pane 302 is presented in a second section 312 of the interface 300A, similar to the third region 154 of user interface 148. However, this is merely an illustrative example and is not intended to be so limiting. For example, the compose selectable option 306 can be presented in association with the second section 312 or a third section (not illustrated).

In various examples, in response to receiving an indication of selection of the compose selectable option 306, the communication platform can cause the new message 304 to be presented via the messaging pane 302. The new message 304 can include a recipient entry field 314 (e.g., "To" field) in which the user 308 can enter a user identifier associated with an intended recipient of the new message 304. The user identifier can include a real name, a username, a handle, an email address, a telephone number, and/or any other information usable to identify the intended recipient (e.g., information associated with a user account of the intended recipient). In the illustrative example, the user identifier includes an email address associated with another user (e.g., User A) associated with ABC Corp, an organization from the user account of the user 308, which is associated with XYZ Corp. Though illustrated as having a single intended recipient (e.g., User A of ABC Corp), this is not intended to be so limiting, and the recipient entry field 314 can include a greater number of intended recipients associated with a one or more organizations that are the same or different from XYZ Corp and/or ABC Corp.

In various examples, the communication platform can receive a portion of the user identifier via the recipient entry field. The portion of the user identifier can include one or more letters, characters, symbols, numbers, and/or the like that represent part or all of the user identifier. For example, the portion of the user identifier can include "usera" of the "usera@abccorp.com" email address. For another example, the portion of the user identifier can include "usera@abccorp" of the email address. Though these are just illustrative examples, and the portion of the user identifier can be smaller or larger (e.g., can include greater or fewer letters, characters, symbols, numbers, etc.).

In various examples, based at least in part on the portion of the user identifier, the communication platform can search one or more contacts lists that are associated with the user account. In some examples, the contacts list(s) can include a communication platform contact list, such as stored in association with the communication platform user data 128. In some examples, the contact list(s) can include an external contact list that was previously made accessible to the communication platform. Based on a determination that the portion of the user identifier is not associated with at least one contact of the one or more contacts lists, the communication platform can cause a no contacts window 316 to be presented via the messaging pane 302. In some examples, the no contacts window 316 can include a no contact message 318 including an indication that no contacts were identified in the one or more contacts lists that match or substantially match (e.g., a percentage such as 85%, 93%, etc. match of letters, characters, symbols, numbers, etc.) the portion of the user identifier. In the illustrative example, the no contact message 318 includes "no people or channels found," however, this is merely an illustrative example and is not intended to be so limiting.

In some examples, the no contacts window 316 can include an invitation selectable option 320 configured to enable the user 308 to invite a new contact to communicate via the communication platform. In various examples, responsive to receiving an indication of selection of the invitation selectable option 320, the communication platform can generate an invitation for to communicate with the user 308 via the communication platform. In some examples, the communication platform can send the invitation to the other user, such as via the user identifier input in the recipient entry field 314. In some examples, the communication platform can provide the invitation to the user 308, for the user to provide to the other user. In some examples, the invitation can include a discrete code associated with the user 308 that, responsive to selection thereof, the communication platform can generate a direct messaging instance or channel between the user 308 and the other user. In some examples, the communication platform can generate the direct messaging instance responsive to receiving an indication of acceptance of the invitation to communicate.

In various examples, the communication platform can be configured to receive an indication of selection of the invitation selectable option 320 via the no contacts window 316 and/or message content input via the message input section 322, and send the message to the other user (e.g., to the user identifier and/or user account associated therewith). In some examples, the message can include the invitation to communicate via the communication platform. For example, the user 308 can input an email address in the recipient entry field 314 and a message in the message input section 322. Based on receiving an indication of selection of the send option 324, the communication platform can send the message to the input email address (e.g., to the recipient). However, these methods of addressing and composing a message to another user can be cumbersome and not desirable for the user 308 to perform. To expedite communications with additional contacts, the user 308 can determine to enable the communication platform to access and/or obtain data associated with an external contacts list that is stored in association with a third-party service provider.

Figure 3B:
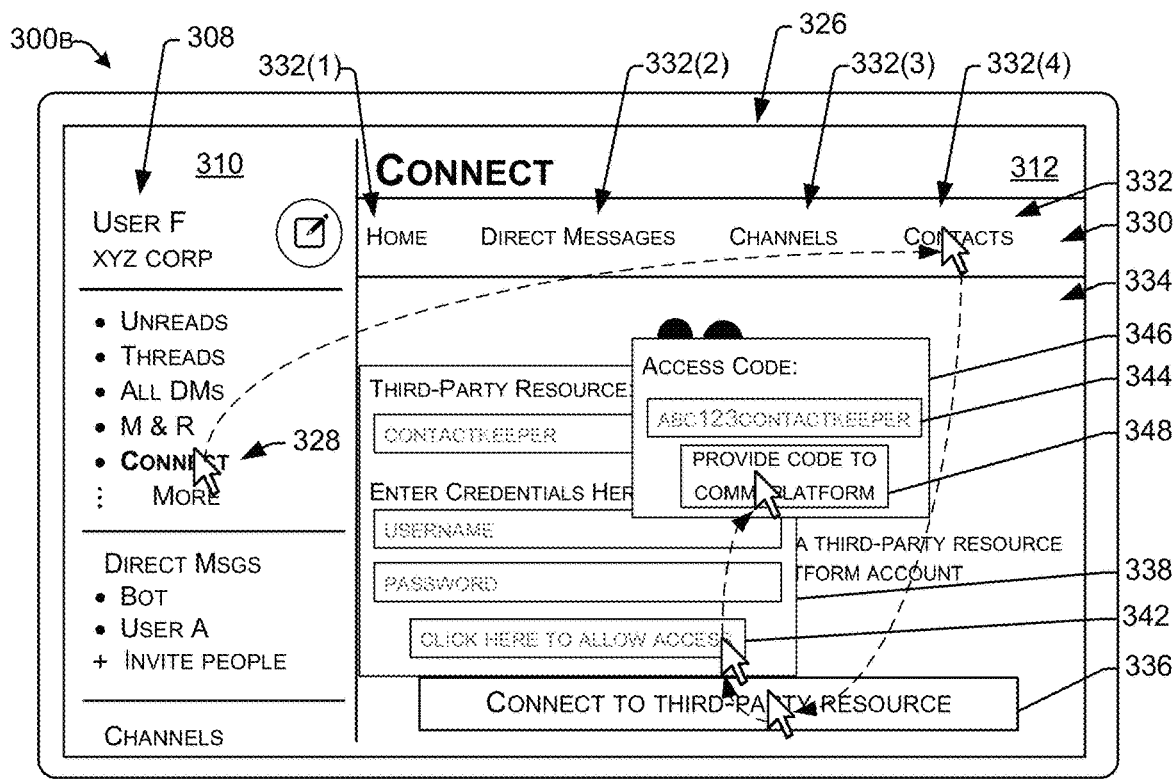

Interface 300B of FIG. 3B illustrates a connect interface 326, such as connect interface 216, via which the user 308 can enable the communication platform to access and/or obtain data associated with an external contacts list that is stored in association with a third-party service provider. In various examples, the communication platform can cause the connect interface 326 to be presented responsive to a selection of a connect indicator 328. In the illustrative example, the connect indicator 328 is illustrated in the first section 310; however, this is not intended to be so limiting and the connect indicator 328 can be presented in the second section 312, or another section of the interface 300B.

As described above with regard to FIGS. 1 and 2, the connect interface 326 can enable expedited communications between the user 308 and one or more external users (e.g., users that are not associated with an organization of the user 308. External users can include other users that are associated with individual accounts (e.g., not associated with an organization), users that are associated with one or more organizations that are different from an organization of the user 308, and the like.

In some examples, the connect interface 326 can include a menu bar 330 with one or more selectable options 332. In the illustrative example, the menu bar 330 includes a home selectable option 332(1), a direct messages selectable option 332(2), such as direct messages selectable option 220, a channels selectable option 332(3), such as channels selectable option 222, and a contacts selectable option 332(4), such as contacts selectable option 224. In various examples, the home selectable option 332(1) can provide a home interface via which the user 308 can cause a new channel and/or direct messaging instance to be generated with an external user. In some examples, the home interface can include additional or alternative options, such as links to external resources (e.g., third-party data to which the communication platform was previously granted access, potential data resources available for connecting to the communication platform, etc.), lists of shared direct messaging instances and/or channels (e.g., direct messaging instances and/or channels that include at least one external user).

In some examples, the direct messages selectable option 332(2) and the channels selectable option 332(3) can include lists of direct messages and channels, respectively, that include at least one external user. In some examples, the direct messages selectable option 332(2) and the channels selectable option 332(3) can include a means by which the user 308 can expedite the generation of a direct message instance and a channel, respectively, with an external user. In some examples, the expedited process can include a process that does not require administrative approval from an administrator of an organization of the user 308 and/or an administrator associated with the external user (e.g., associated with the user account of the external user). In some examples, the expedited process can include a reduced administrative burden on the administrator of the organization of the user 308 and/or the external administrator (e.g., administrator associated with the external user.

In some examples, responsive to receiving an indication of selection of the contacts selectable option 332(4), the communication platform can cause a connection page 334 to be presented via the connect interface 326. In various examples, the connection page 334 can enable the user 308 to permit the communication platform access to data stored in association with the third-party service provider. The data can include data that is associated with the user 308, such as in a third-party user account maintained by the third-party service provider. In at least one example, the data can include an external contact list stored in association with the third-party service provider and maintained by the user 308, such as via a third-party application 146.

In various examples, the connection page 334 can include a connection selectable option 336, such as connection selectable option 156. Responsive to receiving an indication of selection of the connection selectable option 336, the communication platform can cause third-party resource window 338 to be presented via the user computing device 104. In some examples, the third-party resource window 338 can include a window associated with the connect interface 326. In such examples, the communication platform can communicate with a third-party application and/or website to retrieve information to be presented via the third-party resource window 338. In some examples, the information can be updated and/or presented based at least in part on an identification of the third-party resource, such as based on a name, website, application name, or other identifier usable to enable the communication platform to identify and present data associated with the third-party resource.

In some examples, responsive to identification of the third-party resource, the communication platform can cause the third-party resource window 338 to be presented in association with a third-party application, such as that native or accessible to the user computing device (e.g., user computing device 104). In some examples, the communication platform can be configured to communicate with the third-party application to cause the third-party resource window 338 to be presented via the user computing device. In various examples, the third-party resource window 338 can include a means by which the user 308 can submit a first request to a third-party service provider for an access code to provide to the communication platform. As discussed above, the access code can include a token or other secure code that enables the third-party service provider to authenticate a request for data.

In the illustrative example, the third-party resource window 338 includes an identification of the third-party resource, and credential information associated therewith, such as a username and password associated with a third-party user account of the user 308. In other examples, the third-party resource window 338 can include additional or alternative information, such as answers to security questions, two-factor authentication information, and the like. In various examples, responsive to receiving an indication of selection of an allow access selectable control 342, the third-party service provider can provide the code to the user.

Though the illustrative example includes the user 308 submitting the request, such as via the third-party resource window 338, the communication platform can additionally or alternatively be configured to request an access code from the third-party service provider on behalf of the user 308. In such examples, the communication platform can request authenticating information from the user 308, such as third-party user account credentials, answers to security questions, and the like, and can send the first request to the third-party service provider on behalf of the user 308.

In some examples, based on an authentication of the first request for an access code (e.g., from the user 308 via a third-party application or the connect interface 326, or from the communication platform) the third-party service provider can provide a code 344, such as that illustrated in an access code window 346. As discussed above, the code can include a token or other secure identification code used to authenticate with the third-party service provider. In some examples, the communication platform can automatically store the code in association with a user account of the user 308 (e.g., communication platform user account). In some examples, the access code window 346 can include a code submission selectable option 348 enabling the user 308 to provide the code to the communication platform. Responsive to receiving the code, such as after selection of the code submission selectable option 348, the communication platform can store the code in association with the user account. In various examples, the communication platform can be configured to identify the code stored in association with the user account to access or obtain third-party data stored in association with a third-party user account managed by the third-party service provider, such as responsive to receiving an express or implied request to access the third-party data.

Figure 3C:
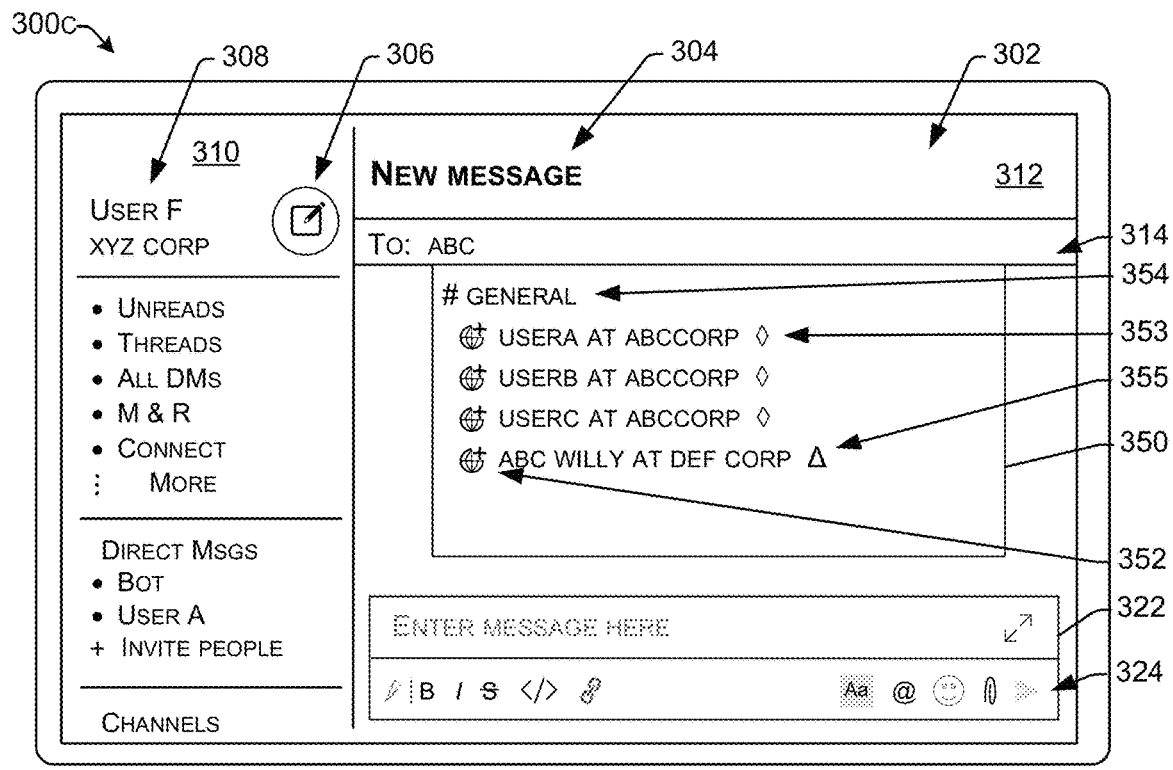

Interface 300C of FIG. 3C illustrates the messaging pane 302 associated with the new message 304, such as after enabling the communication platform access to the third-party data. As discussed above, the communication platform can cause the messaging pane 302 to be presented responsive to receiving an indication of selection of the compose selectable option 306. Further, as described above, the new message 304 can include the recipient entry field 314 in which the user 308 enters the user identifier (or a portion thereof) associated with the intended recipient of the new message 304. In the example illustrated in FIG. 3C, the portion of the user identifier includes "abc." In some examples, the portion of the user identifier can include a portion of contact information associated with the intended recipient (e.g., email address, telephone number, organization, etc.). For example, the portion of the user identifier "abc" can include an indication of an organization (ABC Corp) with which an intended recipient is associated. In such an example, the communication platform can be configured to identify one or more potential intended recipients based on the portion of the user identifier, or, as illustrated, based on an organization the potential intended recipient(s) are associated with. In some examples, the portion of the user identifier can include a name of the intended recipient (e.g., user name, first name, surname, nickname, etc.). For example, the portion of the user identifier "abc" can include an indication of a name of an intended recipient, such as "abc willy." In such an example, the communication platform can be configured to identify one or more potential intended recipients based on a name associated therewith, such as that stored in contact data.

In some examples, the communication platform can determine the portion of the user identifier is associated with at least one contact of at least one contact list. In such examples, the communication platform can cause a contacts window 350 to be presented with the at least one contact (e.g., user identifier associated with a contact). In the illustrative example, the contacts window 350 includes a list of contacts that match or substantially match the portion of the user identifier. For example, the list of contacts in the contacts window 350 includes user identifiers and/or user accounts associated with ABC Corp, such as "usera," "userb," and "userc," and a user identifier and/or user account associated with an individual user "abc willy," identified based on a substantial match of the portion of the user identifier with a portion of the name of the user. In some examples, contacts associated with the list of contacts can be presented in alphabetical order. In other examples, contacts can be presented in another order, such as based on a recency of contact, a frequency of contact, a designation as a "favorite" contact, third-party service provider association (e.g., where the contact data is stored), or the like. For example, a first group of contacts associated with a first third-party service provider can be presented separately from a second group of contacts associated with a second third-party service provider. For another example, the first group of contacts and the second group of contacts can be intermingled in a presentation via the contacts window 350.

In various examples, the contacts data presented via the contacts window 350 can include contact data stored in association with two or more third-party service providers. In such examples, the communication platform can determine a substantial match between at least one contact associated with a first third-party service provider contact list and at least one contact associated with a second third-party service provider contact list and can cause the contacts to be presented via the contacts window 350. In the illustrative example, the communication platform identifies three contacts associated with a first third-party service provider, "usera," "userb," and "userc," and a fourth contact associated with a second third-party service provider, "abc willy at def corp." However, this is merely an example and the contact data associated with the list of contacts can be stored in association with greater or fewer third-party service providers.

In some examples, the communication platform can identify the at least one contact by querying one or more third-party service providers for third-party data. In some examples, the communication platform can determine that the user 308 has associated therewith an external contacts list that is stored in association with the third-party service provider and that the communication platform user account of the user 308 includes the code 344 (code for accessing and/or obtaining the third-party data). In various examples, the communication platform can send a second request to the third-party service provider including the code for authenticating the second request. In at least one example, the second request can include an API call to access and/or obtain data stored in association with the third-party service provider. In some examples, the second request can include the portion of the user identifier, data associated with the user 308 (e.g., third-party user account credentials, etc.), and/or other information to assist the third-party service provider and/or the communication platform in identifying the at least one contact. In such examples, the third-party service provider and/or the communication platform can be configured to identify specific information requested.

In various examples, the communication platform can be configured to send the second request to the third-party service provider periodically (e.g., daily, weekly, bi-weekly, etc.). In such examples, the second request can include a request for updated data since a last (previous) request for third-party data. In some examples, the communication platform can be configured to store the third-party data in a datastore of the communication platform, such as in datastore 126 of the server(s) 102. Based on the periodic updates, the communication platform can be configured to maintain up-to date third-party data. For example, the communication platform can send the second request daily to the third-party service provider to obtain external contact information maintained by the third-party service provider (e.g., daily API call for an external contact list and/or updates thereto). The communication platform can be configured to store the third-party data in association with the communication platform user account, such as in third-party data associated therewith. In some examples, storing data by the communication platform can expedite the presentation of one or more relevant contacts (e.g., substantial matches to the portion of the user identifier) in the recipient entry field 314.

In various examples, the communication platform can be configured to provide an indicator associated with each contact in the list of contacts. The indicator associated with the contact can provide an indication of whether the contact is associated with a same or a different organization, is an individual user (e.g., not associated with an organization), is associated with an external contacts list, is associated with a communication platform contacts list, or other information. For example, as illustrated in FIG. 3C, the contacts "usera," "userb," "userc," and "abc willy" each include an indicator 352 indicating that the contacts are associated with at least one external contacts list. In some examples, the contacts can include an indication of a third-party service provider from which the communication platform obtained the associated contact data. For example, a first indicator 353 indicates that the contact data associated with "usera," "userb," and "userc" is associated with (e.g., obtained from) a first third-party service provider and a second indicator 355 indicates that the contact data associated with "abc willy" is associated with a second third-party service provider.

Additionally or in the alternative, the communication platform and/or the third-party service provider can identify a channel (e.g., communication channel) corresponding to the portion of the user identifier. In such examples, the communication platform can include channel identifier 354 in the contacts window 350. In some examples, responsive to receiving an indication of selection of the channel identifier 354, the communication platform can enable the user 308 to send a message via the channel to one or more users of the other organization (e.g., ABC Corp). In some examples, responsive to receiving an indication of selection of an identifier associated with one or more of the contacts, such as "usera at abccorp," the communication platform can enable the user 308 to send a message to the selected contact(s).

In some examples, the communication platform can identify a single recipient associated with the portion of the user identifier. In such examples, the communication platform can be configured to automatically populate the recipient entry field 314 with the identified recipient and/or the user identifier associated therewith. The automatic entry of the identified recipient and/or the user identifier associated therewith can expedite communications between the user 308 and the intended recipient, thereby reducing processing power of the user computing device and/or server(s) 102 and/or time required to identify the intended recipient.

Figure 3D:
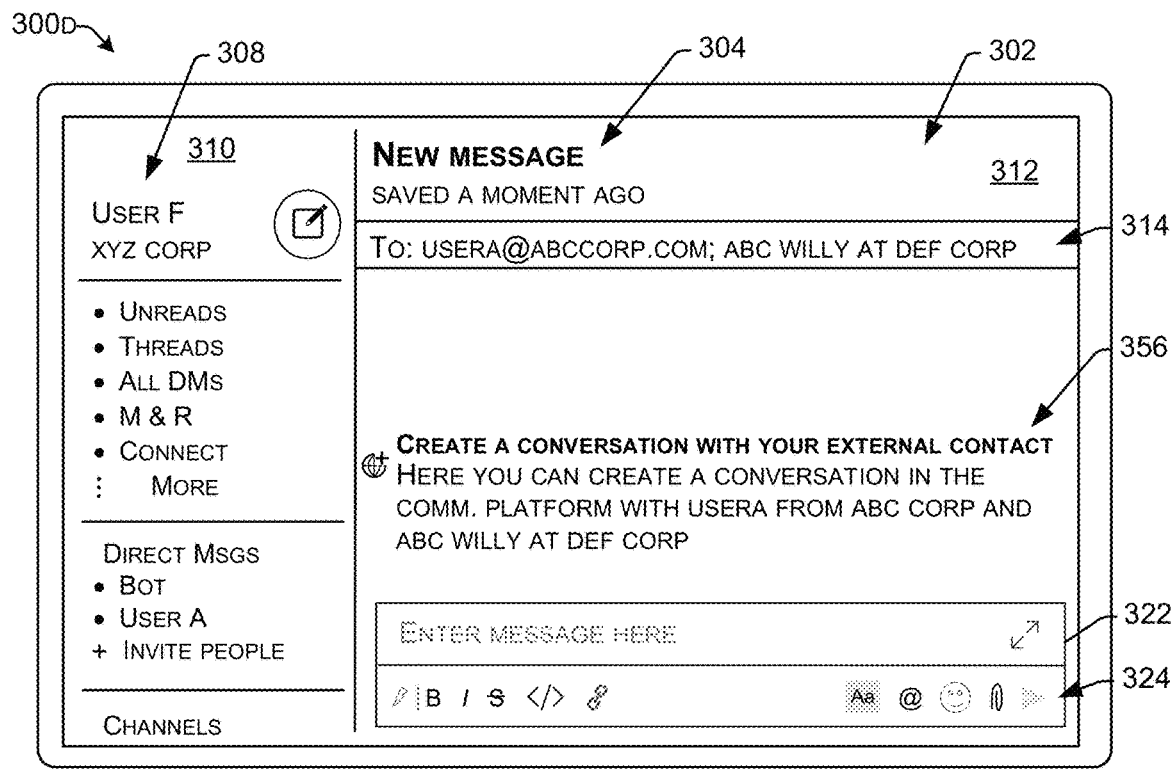

Interface 300D of FIG. 3D illustrates the messaging pane 302 associated with the new message 304 with the intended recipient included in the recipient entry field 314. For example, responsive to receiving an indication of selection of an indicator associated with "usera at abccorp" in the contacts window 350 of interface 300C, the communication platform can include "usera at abccorp" in the recipient entry field 314. In response to receiving a single indication of selection of an indicator associated with a contact, the communication platform can transmit the new message 304 via a direct message to the single intended recipient. In some examples, the communication platform can receive an input associated with two or more contacts in the recipient entry field 314. In such examples, the communication platform can transmit the new message 304 via a multi-person communication environment, such as a multi-person direct messaging instance, a huddle, or the like. In various examples, the two or more contacts can be associated with a same or different organizations. For example, the communication platform receives a first indication of selection of a first indicator associated with "usera at abccorp" and a second indication of selection of a second indicator associated with "abc willy at def corp."

In some examples, the communication platform can determine whether a new message 304 directed to the one or more intended recipient(s) (e.g., usera and abc willy) is a first message sent from the user 308 to the intended recipient via the communication platform. In some examples, based on a determination that a direct messaging instance or a channel exists between the user 308 and the intended recipient(s), the communication platform can surface other messages associated with the direct messaging instance or the channel in the second section 312, such as in a message feed. In some examples, based on a determination that a direct messaging instance or a channel does not exist between the user 308 and the intended recipient(s), the communication platform can present a notification 356 via the messaging pane 302. In some examples, the notification 356 can include an explanation that the user 308 can create a new conversation, such as by causing the communication platform to generate a new direct messaging instance or channel. In some examples, the notification 356 can include a warning that the intended recipient(s) is/are associated with a different organization and to take care in sharing data with the intended recipient(s).

In various examples, responsive to receiving an input via the message input section 322 and an indication of selection of the send option 324, the communication platform can send the message to the intended recipient(s). In some examples, the communication platform can determine that the intended recipient(s) is/are not associated with the communication platform (e.g., does not have a communication platform user account associated therewith). In such examples, the communication platform can send the message via alternative means, such as via email, text message, social networking message, or the like, based at least in part on the user identifier and/or contact information of the intended recipient(s) included in the recipient entry field 314. In some examples, responsive to determining that the intended recipient(s) is/are not associated with the communication platform, the communication platform can initiate a process to associate the intended recipient(s) with the communication platform. In some examples, the communication platform can generate a limited functionality user interface for connecting the user 308 to communicate with one or more other people (e.g., intended recipients) via the communication platform without requiring the intended recipients to create full user accounts on the communication platform.

In some examples, the communication platform can determine that the intended recipient is associated with the communication platform. In such examples, the communication platform can generate a direct messaging instance or channel between the user 308 and the intended recipient, and can send the message via the newly generated direct messaging instance or channel.

Figure 4A:
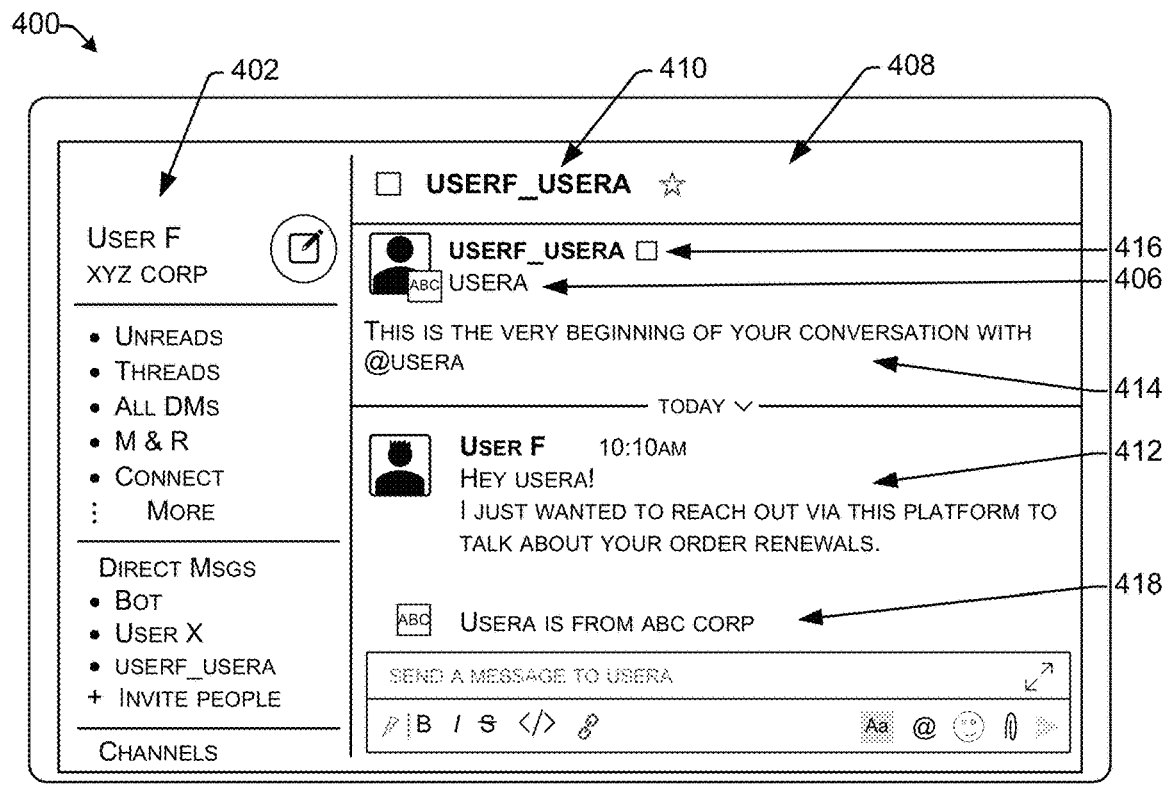
FIGS. 4A and 4B illustrate example user interfaces for communicating between users of different organizations, as described herein.
Figure 4B:
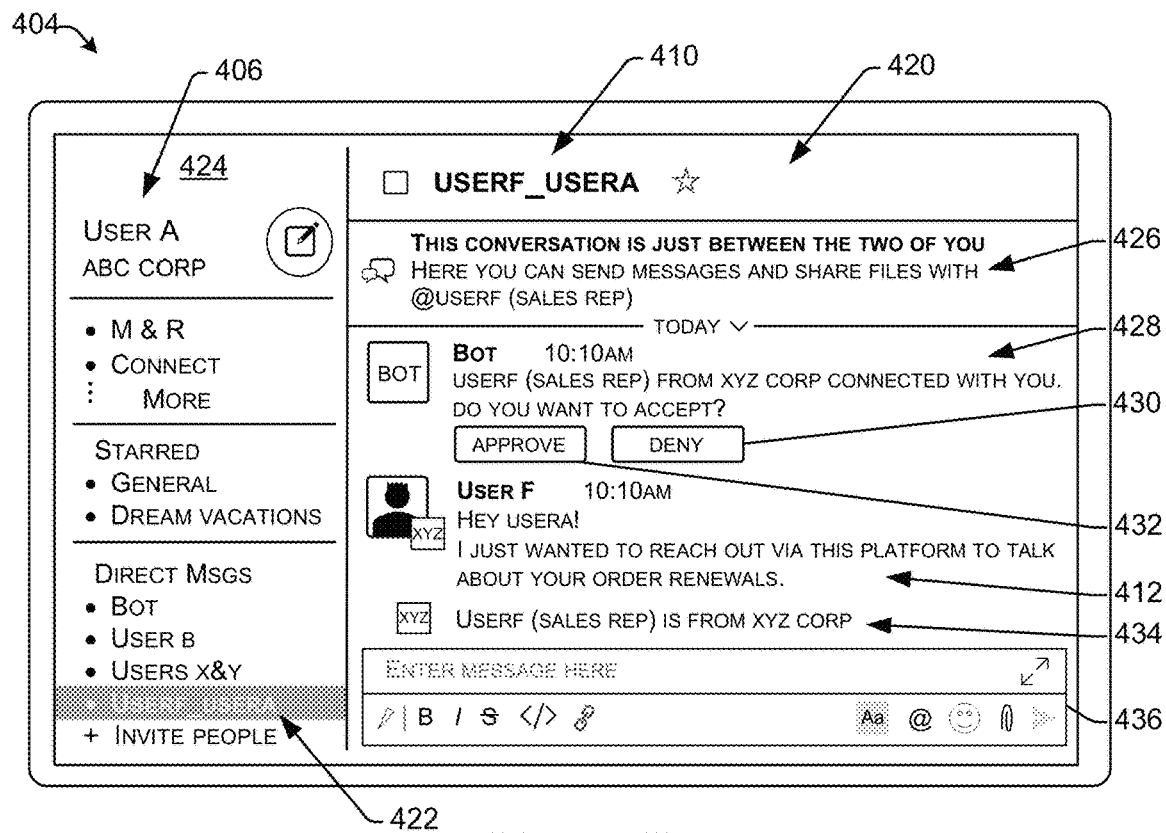

FIGS. 4A and 4B illustrate example first user interface 400 associated with a first user 402 and example second user interface 404 associated with a second user 406 for communicating via the communication platform utilizing the techniques described herein. The first user interface 400 and/or the second user interface 404 can be associated with a user computing device, such as user computing device 104. The first user interface 400 shown in FIG. 4A illustrates first messaging pane 408 associated with the first user 402, such as user 308 of FIGS. 3A-3D. Utilizing the techniques described above, the first user 402 can compose a message to the second user 406 (e.g., the intended recipient).

The first messaging pane 408 can include a label 410 associated with a name or other identifier corresponding to the direct messaging instance or channel generated in response to the first user 402 sending a new message 412 to the second user 406. In some examples, the first messaging pane 408 can include an inception message 414 providing an indication to the first user 402 that the direct messaging instance or channel between the first user 402 and the second user 406 is new. In the illustrative example, the inception message 414 indicates the beginning of the conversation with the second user 406 (e.g., @usera), the label 410 associated with the conversation, and user information associated with the second user 406, such as a picture, a username, and an indication of an organization associated with the second user 406. In other examples, the inception message 414 can include additional or alternative information, such as a real name associated with the second user 406 and/or other user data, contact information, or the like.

In various examples, at least one label 410 illustrated on the first messaging pane 408 can include an indicator 416. The indicator 416 can include any number of symbols, characters, shapes, and/or combinations of the foregoing. The indicator 416 can provide an indication that the associated direct messaging instance or channel is a shared direct messaging instance or channel (e.g., that the second user 406 is not associated with a same organization as the first user 402. For example, a indicator 416 that includes a box shape can indicate a shared channel, though this is merely an illustration and any number of shapes, characters, or the like can be used to indicate the shared channel. In some examples, the indicator 416 can provide an indication of whether the associated direct messaging instance or channel has or has not been approved by the second user 406. For example, prior to approval of the associated direct messaging instance or channel, the indicator 416 can include a box that is not filled. After approval of the associated direct messaging instance or channel, the indicator 416 can include a box that is filled in. The approval of the associated direct messaging instance or channel will be described in further detail below with regard to FIG. 4B.

In some examples, the first messaging pane 408 can include a first shared resource indicator 418. The first shared resource indicator 418 can provide an indication that the direct messaging instance or channel associated with the conversation is a shared resource (e.g., associated with two or more different organizations). In some examples, the first shared resource indicator 418 can include an additional warning or indication to the first user 402 that the second user 406 is associated with a different organization (e.g., ABC Corp) than the organization of the first user 402 (e.g., XYZ Corp).

A second user interface 404 shown in FIG. 4B illustrates second messaging pane 420 associated with the second user 406. As discussed above, the second user 406 can be an intended recipient of a message sent from the first user 402 and via the communication platform. In the illustrative example, the second user interface 404 and the second messaging pane 420 are associated with the communication platform. However, this is not intended to be so limiting and the second user interface 404 can include a different interface configured to present a message transmitted via the communication platform and received by another application or program of a user computing device of the second user 406. For example, the second user interface 404 could be associated with an email application and an email account of the second user 406.

In various examples, in response to receiving the message 412 transmitted from the first user 402 (e.g., a first user account, first user computing device associated with the first user 402), the communication platform can determine whether a user account associated with the second user 406 includes permissions settings that enable direct messaging instances and/or channels generated utilizing the techniques described herein. In some examples, the permissions can be associated with a particular user account corresponding to the second user 406. In some examples, the permissions can be associated with an organization associated with the second user 406. In some examples, the permissions can require a prior approval of an administrator associated with the second user 406 prior to receiving the message 412. In some examples, the prior approval permissions can be determined based on a type of user account associated with the first user 402 and/or the second user 406 (e.g., full functionality user account, limited functionality user account, individual user account (e.g., not associated with an organization), personal user account, professional user account, etc.), a type of organization associated with the first user 402 and/or the second user 406 (e.g., non-profit, corporation, sole proprietorship, small business (e.g., less than 250 employees), large business (250 or more employees, etc.), and the like.

Based on a determination that the permissions associated with the second user 406 require administrative approval prior to providing the message 412 to the second user 406, the communication platform can send an indication of the message 412 to an administrative computing device associated with the second user. The administrative computing device can include a user computing device, such as user computing device 104, associated with an administrative user account with associated administrative privileges, such as to initially approve or deny communications between the first user 402 and the second user 406. In some examples, responsive to receiving an indication that the communications between the first user 402 and the second user 406 are denied by the administrator, the communication platform can cause an indication of the failed message to be presented to the first user, such as via the first user interface 400. In such examples, the message 412 may not be provided to the second user 406 via the second user interface 404

In some examples, in response to receiving an indication that the communications between the first user 402 and the second user 406 are authorized and/or determining that administrative approval is not required based on permissions associated with a user account and/or organization of the second user 406, the communication platform can cause a new conversation indicator 422 to be presented in a first section 424, such as first section 310, of the second user interface 404. Though illustrated as a direct messaging instance (e.g., in a sub-section of the first section 424 associated with direct messaging instances), this is not intended to be so limiting and it is understood that the message 412 can be transmitted via a channel, in a workspace, on a board, or the like.

In various examples, the new conversation indicator 422 can include an indication of a muted conversation. In such examples, the muted conversation can include a conversation that has not yet been accepted by the second user 406. In the illustrative example, the muted conversation is indicated by a different font color from other direct messaging instances and/or channels, though this is merely an example and the muted conversation can be indicated by a symbol, character, or other marker used to indicate that the new conversation has not yet been accepted by the second user 406.

In some examples, the new conversation indicator 422 can include an indication that the conversation is new and has not yet been viewed by the second user 406. In such examples, the indication can illustrate that the new conversation is "unread." In at least one example, the new conversation indicator 422 can illustrate that the new conversation is "unread" by including bolded font associated with a label associated therewith. The label can include a descriptor associated with the direct messaging instance or channel associated therewith, such as to provide an indication of two or more users associated with the conversation. The label can be the same or different from label 410.

In some examples, in response to receiving an indication of selection of the new conversation indicator 422, the communication platform can cause the second messaging pane 420 to be presented to the second user 406 via the second user interface 404. The second messaging pane 420 can include an inception message 426 providing an indication that the conversation is a private conversation between the first user 402 and the second user 406. In some examples, the inception message can include information about the two or more users associated with the conversation (e.g., the direct messaging instance or channel). In the illustrative example, the conversation is between the first user 402 and the second user 406, so an indication of the first user 402 is provided to the second user 406.

In some examples, the inception message 426 can include additional user information associated with other users of the conversation (e.g., the first user 402). For example, the inception message 426 can include a username, a position, an organization, and/or other user information associated with the first user 402. In some examples, the inception message 426 can include an indication of data that can be shared between the first user 402 and the second user 406 in the conversation. In the illustrative example, the inception message 426 includes an indication that messages and files can be shared between the first user 402 and the second user 406. In other examples, additional or alternative information can be presented in association with the inception message 426.

In various examples, the communication platform can cause an automated message 428 to be presented via the second messaging pane 420. The automated message 428 can include a message that is generated by the communication platform, such as to provide the second user 406 the opportunity to approve or deny the conversation with the first user 402. The automated message 428 can provide identifying information about the first user 402, such as a name, position, associated organization, and/or any other relevant information to assist in informing a decision to approve or deny the conversation.

In the illustrative example, the automated message 428 includes a deny selectable option 430 and an approve selectable option 432. In some embodiments, a preview of the message or the full message is included along with the automated message 428. In some embodiments, the message is only displayed once the user has opted to approve the initiation of the conversation by selecting the approve option 432. Responsive to receiving an indication of selection of the deny selectable option 430, the communication platform can remove the new conversation indicator 422 from the first section 424 of the second user interface 404. In other words, the communication platform can modify a sidebar (e.g., the first section 424) of the second user interface 404 to remove the direct messaging instance (or channel) associated with the conversation generated by the first user 402 and subsequently denied by the second user 406. In some examples, such as in examples in which the conversation is a private conversation between the first user 402 and the second user, the communication platform can additionally delete the direct messaging instance (or channel) associated with the conversation from a datastore. In such examples, the communication platform can modify a sidebar associated with the first user interface 400 to indicate that the conversation is not a viable means of communication. In some examples, the modification can include an indication of a muted conversation, a deletion of the indicator associated with the conversation in the sidebar, or the like. In some examples, the communication platform can cause a notification to be presented to the first user 402 indicating that the second user 406 denied the conversation. In such examples, the notification can include a pop-up notification, a message in the direct messaging instance (e.g., automated message), a text message, or the like. In examples in which the notification is an automated message presented in association with the conversation, the communication platform can provide an indication that the conversation will be deleted at a future time (e.g., after the first user 402 reads the automated message, responsive to receiving an indication that the first user 402 acknowledges the automated message, etc.).

Responsive to receiving an indication of selection of the approve selectable option 432, the communication platform can complete generation of the direct messaging instance (or channel) and store messages associated therewith in association with a user account of the second user 406. In some examples, the communication platform can modify the sidebar pane of the second user interface 404 to reflect that the conversation has been accepted. For example, the communication platform can modify the new conversation indicator 422 from a muted conversation indicator (e.g., gray text) to an unmuted conversation indicator (e.g., black text). For another example, the communication platform can modify the new conversation indicator from an "unread" indicator (e.g., bold font) to a "read" indicator (e.g., non-bold font).

In various examples, the second messaging pane 420 can include the message 412. In some examples, the communication platform can cause the message to be presented on the second messaging pane 420 responsive to receiving an indication that the second user 406 selected the approve selectable option 432. In some examples, the communication platform can cause the message 412 to be presented on the second messaging pane 420 at substantially the same time (e.g., within 10 seconds, within one minute, within two minutes, etc.) as the automated message 428.

Additionally, in some examples, the communication platform can cause a second shared resource indicator 434 to be presented on the second messaging pane. In some embodiments, the shared resource indicator 434 is presented in a context bar in the second messaging pane, where the context bar is used to provide additional information or context about the other user in the different organization. The second shared resource indicator 434, similar to the first shared resource indicator 418, can include an additional warning or indication to the second user 406 that the first user 402 is associated with a different organization (e.g., XYZ Corp) than the organization of the second user 406 (e.g., ABC Corp). Accordingly, the second shared resource indicator 434 can remind the second user 406 to be mindful of information or files shared via the direct messaging instance (or channel) associated with the conversation, such as in additional messages drafted using the message input section 436, such as message input section 322. The second user 406 can compose and transmit messages via the communication platform utilizing the message input section 436, such as to continue the conversation, share information in text, attached files, links, and the like. The communication platform can receive an additional message input via the message input section 436 (e.g., received from a user computing device of the second user 406), can cause the message to be presented via the first messaging pane 408, and can store the additional message in association with user accounts of the second user 406 and/or the first user 402.

FIGS. 5-8 are flowcharts showing example processes involving techniques as described herein. The processes illustrated in FIGS. 5-8 are described with reference to components described above with reference to the system 100 shown in FIG. 1 for convenience and ease of understanding. However, the processes illustrated in FIGS. 5-8 are not limited to being performed using the components described above with reference to the system 100. Moreover, the components described above with reference to the system 100 are not limited to performing the processes illustrated in FIGS. 5-8.

Figure 5:
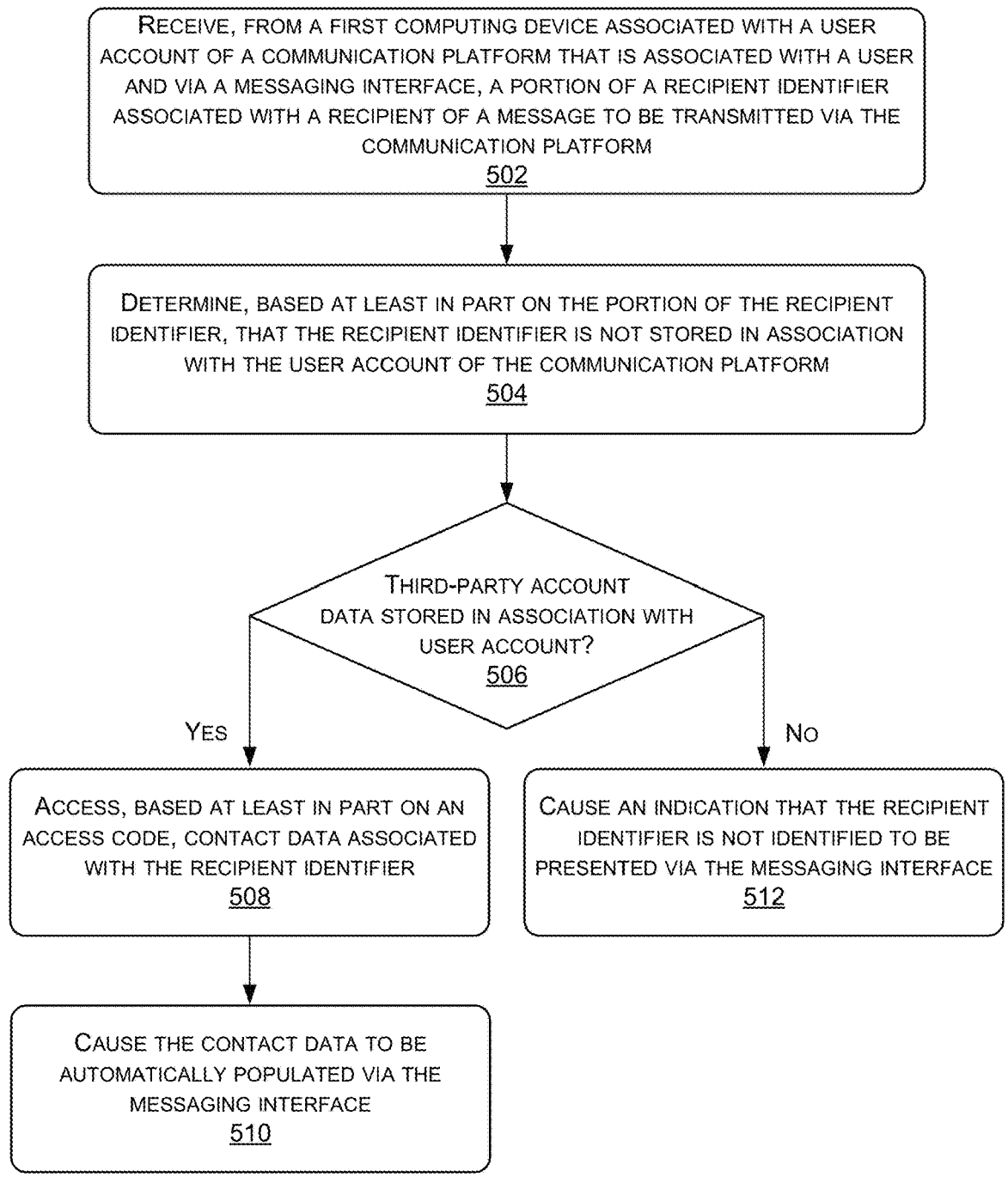
FIG. 5 illustrates an example process for populating a messaging interface based at least in part on data obtained from a third-party resource, as described herein.

FIG. 5 illustrates an example process 500 for populating a messaging interface based at least in part on data obtained from a third-party resource, as described herein.

At operation 502, a server 102 receives, from a first computing device associated with a user account of a communication platform that is associated with a user and via a messaging interface, a portion of a recipient identifier associated with a recipient of a message to be transmitted via the communication platform. The portion of the recipient identifier can be received via a recipient entry field of a messaging interface, such as recipient entry field 314. In some examples, the portion of the recipient identifier can include one or more letters, characters, symbols, numbers, and/or the like that represent part or all of the user identifier. For example, the portion of the user identifier can include "Johnson Sales," a name of a sales account associated with group of users, the contact data associated therewith being stored in association with the third-party resource (e.g., third-party service provider).

In various examples, the server 102 can determine that the input of the portion of the recipient identifier includes an implied request to access data stored in association with a third-party service provider. In other examples, the request can include an express request to access particular data that is stored in association with a third-party service provider. For example, the user can submit a request for the server 102 to download an external contact list stored in association with the third-party service provider. Though described herein as being associated with contact data associated with an external contact list (e.g., personalized data resource), this is not intended to be so limiting and the techniques described herein can be used to access other data of the user that is stored in association with a third-party service provider. For another example, the user can submit a request for the server 102 to download one or more files stored in association with the third-party service provider.

At operation 504, the server 102 determines, based at least in part on the portion of the recipient identifier, that the recipient identifier is not stored in association with the user account of the communication platform. In other words, the server 102 can search a communication platform contact list including other users with whom the user has an existing relationship (e.g., has previously communicated with, is connected via a workspace, organization, communication channel, direct messaging instance, etc.) and determine that the portion of the recipient identifier is not associated with a user or contact associated with the communication platform contact list.

At operation 506, the server 102 determine whether third-party account data is stored in association with the user account. In various examples, the server 102 can determine that the third-party account data is stored in association with the user account based on a determination that the user account has a third-party code (e.g., authorization code, etc.) associated therewith. As discussed above, the third-party code may include a token or other access code that is usable to authenticate a request for data. In some examples, the third-party code may be a code that is usable to request the data in a backend process, such as via an API call to a third-party computing device of the third-party service provider. As discussed above, the third-party code may include a code that is provided to the communication platform by the user or the third-party service provider in response to receiving a request from the user to provide the communication platform access to the data of the user that is stored in association with the third-party service provider.

Based on a determination that the third-party account data is stored in association with the user account ("Yes" at operation 506), the server 102, at operation 508, accesses contact data associated with the recipient identifier based at least in part on an access code. In various examples, the server 102 may send an API call or other request to the third-party service provider. In such examples, the API call or other request may include the third-party code and/or the data requested (e.g., contact data associated with the portion of the recipient identifier, an updated external contact list, etc.). In various examples, the communication platform may cause the computing device associated with the third-party service provider to authenticate the request, such as based on the code. In response to an authentication of the request, the third-party computing device can provide the requested data to the communication platform.

At operation 510, the server 102 cause the contact data to be automatically populated via the messaging interface. In some examples, the server 102 can automatically populate the contact data in the recipient entry field of the messaging interface. For example, based on a determination that a single contact is associated with the portion of the recipient identifier and no other channels, direct messaging instances, or user accounts are associated with the portion of the recipient identifier, the server(s) can automatically populate the recipient entry field 314 with contact data associated with the single contact.

In some examples, the server 102 can identify one or more contacts, direct messaging instances, and/or channels associated with the portion of the recipient identifier. The server 102 can generate a list of contacts based on the identification of the contact(s), direct messaging instance(s), and/or the channel(s) associated with the portion of the recipient identifier. The server 102 can cause the list of contacts to be presented to the user via the messaging interface. As discussed above, the list can be presented in alphabetical order, an order determined based on recency of communications, frequency of communications, indication of a "favorite," close contact, or the like.

Based on a determination that the third-party account data is not stored in association with the user account ("No" at operation 506), the server(s) 102, at operation 512, causes an indication that the recipient identifier is not identified to be presented via the messaging interface. In various examples, the indication that the recipient identifier is not identified can include a no contact message, such as no contact message 318. In some examples, the indication that the recipient identifier is not identified can be presented in a pop-up notification or other means by which the communication platform can inform the user about a failure to identify the intended recipient.

Figure 6:
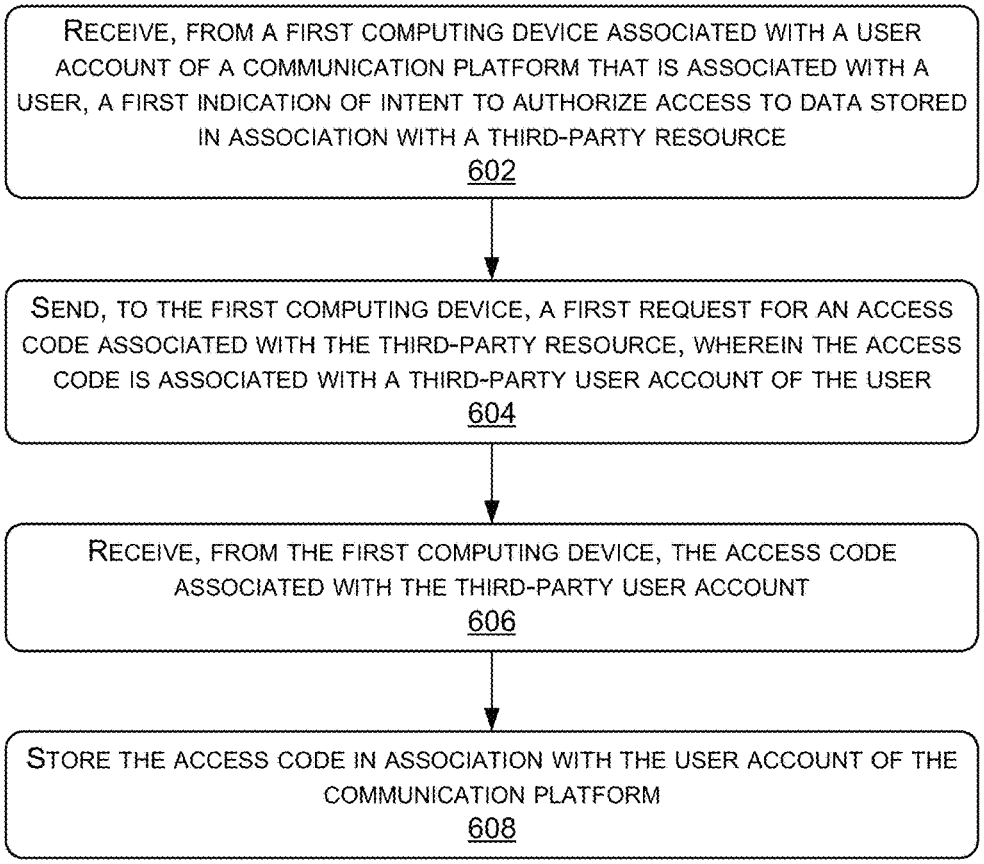
FIG. 6 illustrates an example process for receiving an access code for obtaining data stored in association with third-party resource, as described herein.

FIG. 6 illustrates an example process 600 for receiving an access code for obtaining data stored in association with third-party resource, as described herein.

At operation 602, a server 102 receives, from a first computing device associated with a user account of a communication platform that is associated with a user, a first indication of intent to authorize access to data stored in association with a third-party resource (e.g., third-party service provider). The data may include third-party data that is associated with the user. In at least one example, the data may include an external contacts list, such as a contacts list that is managed by the user and stored in association with the third-party service provider. The external contacts list can include various contact data associated with personal and/or professional contacts of the user. Non limiting examples of contact data include an email address, physical address, social networking handle, username associated with the communication platform (e.g., communication platform user account data), telephone, organization data (e.g., one or more organizations with whom the contact has a connection (e.g., is employed by, collaborates with, sells to, etc.), data associated with an organizational structure of the organization, etc.), professional data (e.g., position, title, employment duration, etc.), sales data (e.g., sales rates, performance indicators (e.g., revenue, market penetration, year-to-year growth, etc.), customer revenue (e.g., average lifetime value, annual value, etc.), sales relationships (e.g., clients, suppliers, sales representative, etc.), social connections (e.g., one or more other contacts a contact is related to, in a relationship with (e.g., friends, co-workers, etc.), etc.), and/or any other information that may describe who the contact is and how to communicate with the contact. For example, the contact data can include relationships between contacts, such as in a social networking structure, within an organization, or the like. For another example, the contact data can include a record of prior communications between users, such as frequency of communications, recency of communications, and the like. For yet another example, the contact data can include professional data, such as data indicating that a contact is a client of a sales representative and data of the relationship between the sales representative and the client (e.g., type of sales, annual revenue, dates of sales events, frequency of sales events, revenue per sales event, etc.).

In various examples, the indication of intent may include an indication of selection of a connection selectable option, such as connection selectable option 156 and connection selectable option 336. In such examples, the server 102 may receive the indication of intent via an interface associated with the communication platform, such as via an instance of an application accessed via the first computing device. In some examples, the indication of intent may be received responsive to input from the user, such as during an initial user account set-up, updating user account settings, or the like. In some examples, the indication of intent may include an indication of selection of an automated message presented in response to the communication platform determining that a portion of a recipient identifier input via a messaging interface is not recognized. In such examples, the server 102 may cause a no contact message, such as no contact message 318 to be presented via the messaging interface as well as an automated message informing the user that it is possible to access external contacts lists via the communication platform, and providing the user with a connection selectable option to facilitate communications.

At operation 604, the server 102 sends, to the first computing device, a first request for an access code associated with the third-party resource, wherein the access code is associated with a third-party user account of the user. As discussed above, the access code may include a token or other code usable to authenticate a request for data. In some examples, the server 102 may cause a third-party application to launch via the first computing device, such as to enable the user to request the access code. In some examples, the communication platform may enable the user to request the access code by transmitting data between the third-party resource and the user, such as utilizing APIs that enable communication between the communication platform and the third-party resource. In such examples, the server 102 may request data from the user, such as third-party user account data (e.g., username, password, answers to security questions, two-factor authentication information, etc.).

At operation 606, the server 102 receives, from the first computing device, the access code associated with the third-party user account. In some examples, the server 102 can receive the access code directly from the third-party resource, such as when facilitating the user in acquiring the code (e.g., transmitting data between the user and the third-party resource, requesting the code on behalf of the user, etc.).

At operation 608, the server 102 stores the access code in association with the user account of the communication platform. As discussed herein, the server 102 can include the access code in subsequent requests for data in association with the user account (e.g., data requested on behalf of the user, data requested to facilitate communication between the user and a contact of the user (e.g., another user of the communication platform, another user not associated with the communication platform, etc.).

Figure 7:
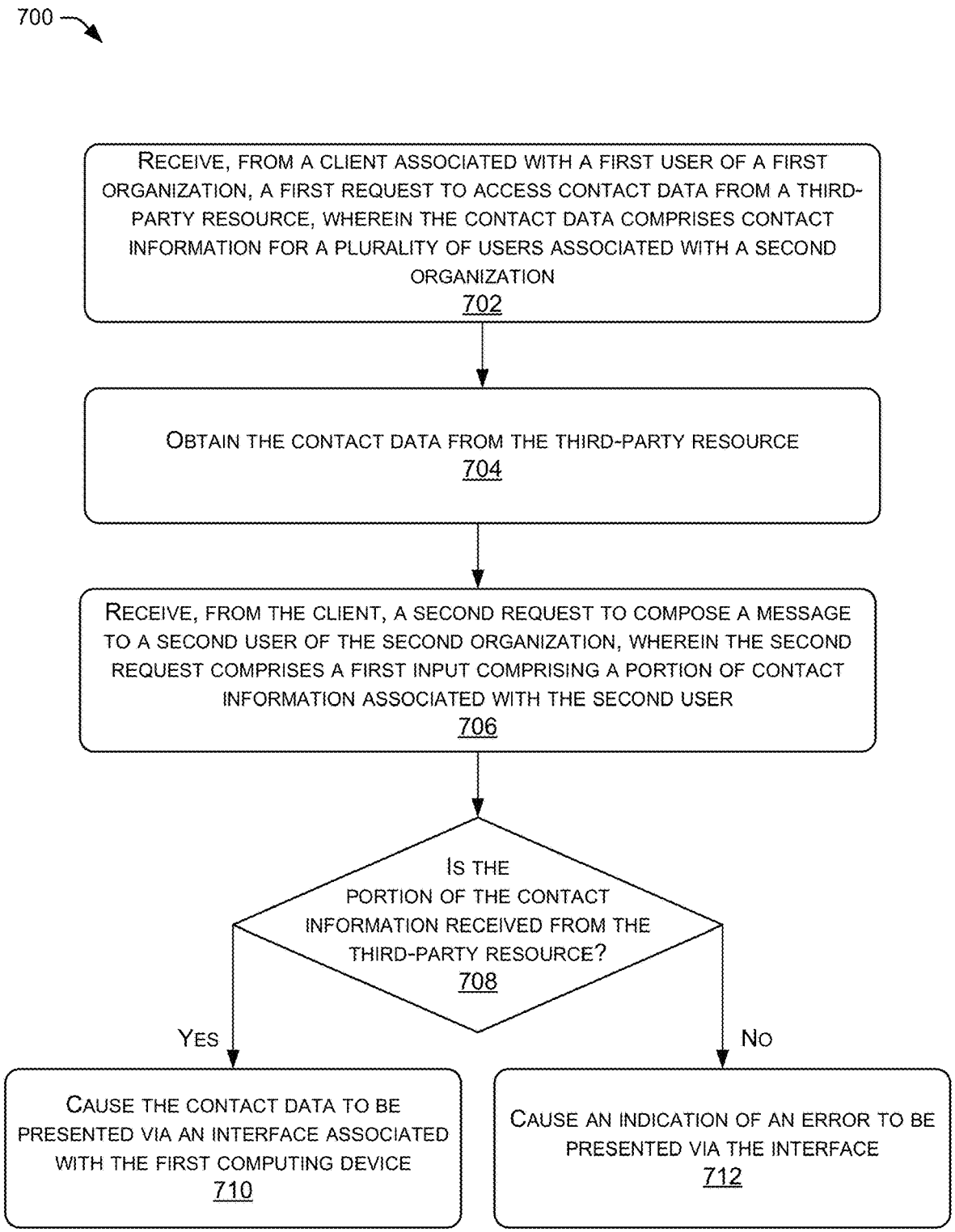
FIG. 7 illustrates an example process for obtaining data stored in association with a third-party resource based at least in part on an access code, as described herein.

An example process 700 for obtaining data stored in association with the third-party resource based on the access code is of the request for data is illustrated in FIG. 7.

At operation 702, the server 102 receives, from a client associated with a first user of a first organization, a first request to access contact data from a third-party resource, wherein the contact data comprises contact information for a plurality of users associated with a second organization. In some examples, the first request can include an express request to access the contact data. An express request may include a request submitted via an interface of the communication platform to obtain particular data that is stored remotely or externally from the communication platform. For example, the first user can submit a first request for the communication platform to download an external contact list stored by the third-party service provider.

In some examples, the first request can include an implied request to access the data. In such examples, the communication platform can obtain and/or access the data stored by the third-party service provider responsive to receiving the implied request. The implied request can be associated with initiating a message to a contact, conducting a search for information, or the like. For example, the first user can input a portion of a user identifier (e.g., username, real name, email address, organization, etc.) associated with an intended recipient of a message into a messaging interface of the communication platform (e.g., into a "To" field of the messaging interface). The communication platform can search a contact list of the first user managed by the communication platform (e.g., stored in association with a first user account) to determine whether the user identifier is associated with a contact stored in the contact list. Based on a determination that the user identifier is not associated with the contact list associated with the first user account, the communication platform can identify an implied request to access data stored in association with the third-party resource.

At operation 704, the server 102 obtains the contact data from the third-party resource. In some examples, obtaining the contact data can include sending, to a computing device associated with the third-party resource, a request to access the data, the request including an access code. As discussed above, the access code can include a token or other secure identification code used to authenticate with the third-party resource. In some examples, the server 102 can send the request in a backend process, such as in an API call, to access data stored in association with the third-party resource. In at least one example, the token or code can be associated with a third-party user account associated with the user. In such an example, the communication platform can send an API call to the third-party resource including the token or code to access data stored in association with the third-party user account. Continuing the example from above, the server 102 can send an API call with a code and the portion of the user identifier to access contact data associated with one or more contacts that substantially match the portion of the user identifier, such as to facilitate addressing a message to a particular user.

At operation 706, the server 102 receives, from the client, a second request to compose a message to a second user of the second organization, wherein the second request comprises a first input comprising a portion of contact information associated with the second user. As discussed above, the second request can include an implied request to access contact data stored in association with the third-party resource. In various examples, the portion of the contact information can include a portion of a name, username email address, telephone number, social networking handle, or the like. In some examples, such as that illustrated in FIG. 3C, the portion of the contact information can include a name of an organization with which the second user is associated.

At operation 708, the server 102 determines whether the portion of the contact information is received from the third-party resource. In some examples, the third-party resource may be unable to authenticate the second request. In such examples, the server 102 can receive, from the third-party computing device of the third-party resource, a failure message indicating the second request was not authenticated, failed, or the like. In some examples, the server 102 can receive an indication that the requested data was not identified and/or is not stored in association with the third-party resource. For example, an external contacts list not include a contact that substantially matches the portion of the user identifier. Based on the determination that no contact is identified as substantially matching the portion of the user identifier, the server 102 determines that the data is not received from the third-party resource.

In various examples, the server 102 receives the data from the third-party resource in response to the second request. In some examples, the server 102 can store the data in a datastore of the communication platform, such as in association with a communication platform user account of the user.

Based on a determination that the data is received from the third-party resource ("Yes" at operation 708), the server 102, at operation 710, causes the contact data to be presented via an interface associated with the first computing device. For example, a contact can be identified that substantially matches the portion of the user identifier. The server 102 can cause the contact data associated with the contact to automatically populate via the interface, such as in a recipient entry field. For another example, the server 102 can determine that two or more contacts (e.g., individuals, channels, direct messaging instances) substantially match the portion of the user identifier. The server 102 can cause the two or more contacts to be presented in a list of contacts via the interface, such as for user selection of one or more intended recipients of the message.

Based on a determination that the data is not received from the third-party resource ("No" at operation 708), the server 102, at operation 712, causes an indication of an error to be presented via the interface. In some examples, the indication of the error may include a no contact message, such as no contact message 318. In such examples, the indication of the error may provide an indication to the user that the portion of the user identifier did not substantially match any contact associated with a communication platform contact list or the external contact list.

Figure 8:
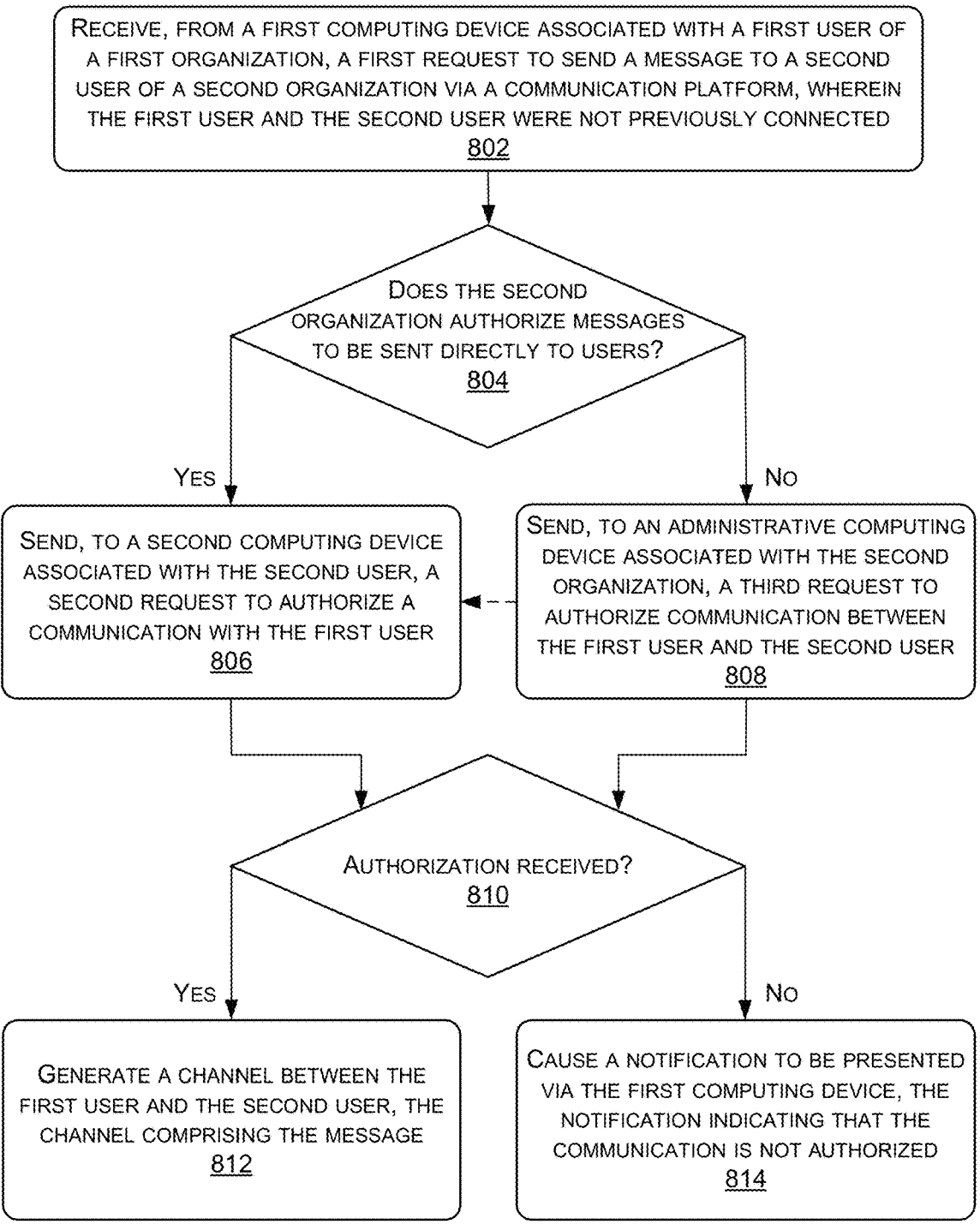
FIG. 8 illustrates an example process for facilitating communications between users based at least in part on authorization from at least one user of an organization, as described herein.

FIG. 8 illustrates an example process 800 for facilitating communications between users based at least in part on authorization from at least one user of an organization, as described herein At operation 802, the server 102 receives, from a first computing device associated with a first user of a first organization, a first request to send a message to a second user of a second organization via a communication platform, wherein the first user and the second user were not previously connected via the communication platform. In some examples, the first request may include an express request to send the message to the second user with whom the first user is not connected. For example, the first request may include an indication of intent to "connect to someone new," such as via a connect interface. The first user may subsequently input contact data (e.g., username, real name, email address, telephone number, social media handle, etc.) associated with the second user and data associated with a message, such as via a messaging interface.

In some examples, the server 102 can determine that the first request is an implied request. In some examples, the server 102 can determine the implied request based on a determination that contact data input via the messaging interface does not substantially match a contact stored in association with a communication platform contacts list. Based on the determination, the server 102 determines that the first user and the second user were not previously connected via the communication platform.

At operation 804, the server 102 determines whether the second organization authorizes messages to be sent directly to users without a previous connection. In various examples, the server 102 can access organizational permissions associated with the second organization to determine whether the second organization authorizes the messages sent directly to the users. In some examples, the organizational permissions may permit the messages to be sent to all users of the second organization, may permit the messages to be sent to select users associated with select user accounts (e.g., managers, board of governors, etc.), may permit the messages sent from users of one or more particular organizations (e.g., messages from users of ABC organization authorized, users from XYZ organization require administrator approval, etc.), may require administrative approval of all or a portion of the messages based on the intended recipient (e.g., messages to users other than those associated with the select user accounts), may require administrative approval of messages based on an organization of the first user, and the like. The organizational permissions may provide an additional level of security for the organization to determine shared resources (e.g., shared channels, shared direct message instances) that may be authorized without administrative approval.

Based on a determination that the second organization authorizes messages to be sent directly to the users ("Yes" at operation 804), the server 102, at operation 806, sends, to a second computing device associated with the second users, a second request to authorize a communication with the first user. In some examples, the second request can be presented as a pop-up notification or the like to indicate to the second user that a request for a new conversation is pending. In some examples, the second request can be sent in association with a new conversation (e.g., new direct messaging instance or new channel). In such examples, the server 102 can generate the new direct messaging instance or the new channel in response to receiving the first request. In some examples, a new conversation indicator of the new direct messaging instance or the new channel (e.g., new conversation indicator 422) can be presented in association with messaging interfaces associated with the first user and the second user, such as in respective sidebar interfaces. In some examples, the new conversation indicator associated with the messaging interface of the second user can include a muted conversation indicator, such as to indicate that the conversation has not yet been approved. In some examples, the new conversation indicator associated with the messaging interface of the second user can include an "unread" indicator, such as to indicate that the conversation has not been read.

In some examples, the second request may include an automated message, such as automated message 428, to be presented via the messaging interface associated with the second user. The automated message can include a message that is generated by the communication platform, such as to provide the second user the opportunity to approve or deny the conversation with the first user. The automated message can provide identifying information about the first user, such as a name, position, associated organization, and/or any other relevant information to assist in informing a decision to approve or deny the conversation.

In various examples, the automated message can include a deny selectable option, such as deny selectable option 430, and an approve selectable option, such as approve selectable option 432. Responsive to receiving an indication of selection of the approve selectable option, the server 102 can complete the creation of the direct messaging instance or the channel. For example, the server 102 can cause the new conversation indicator to be modified from a muted conversation to an unmuted conversation. The server 102 can subsequently transmit messages between the first user and the second user via the direct messaging instance or the channel.

Responsive to receiving an indication of selection of the deny selectable option, the server 102 can remove the new conversation indicator from the messaging interface. In other words, the server 102 can modify a sidebar of the messaging interface to remove the direct messaging instance (or channel) associated with the conversation generated by the first user and subsequently denied by the second user. In some examples, such as in examples in which the conversation is a private conversation between the first user and the second user, the server 102 can additionally delete the direct messaging instance (or channel) associated with the conversation from a datastore. In such examples, the server 102 can modify a sidebar associated with the messaging interface of the first user to indicate that the conversation is not a viable means of communication. In some examples, the modification can include an indication of a muted conversation, a deletion of the new conversation indicator, or the like. In some examples, the server 102 can cause a notification to be presented to the first user indicating that the second user denied the conversation. In such examples, the notification can include a pop-up notification, a message in the direct messaging instance (e.g., automated message), a text message, or the like. In examples in which the notification is an automated message presented in association with the conversation, the server 102 can provide an indication that the conversation will be deleted at a future time (e.g., after the first user reads the automated message, responsive to receiving an indication that the first user acknowledges the automated message, etc.).

Based on a determination that the second organization does not authorize messages to be sent directly to the users ("No" at operation 804), the server 102, at operation 808 sends, to an administrative computing device associated with the second organization, a third request to authorize communication between the first user and the second user. In various examples, the administrative computing device can be associated with an administrative account (e.g., an administrator) of the second organization. The administrative account can include the account associated with establishing and maintaining organizational permissions, such as those described above. In various examples, the server 102 can send the third request to the administrative computing device in response to determining that an administrative permission associated with the second organization requires administrative approval, such as based on the first user, the first organization, the type of message or conversation (e.g., via a direct messaging instance, channel, etc.), a number or identification of other users associated with the conversation, the lack of a previous connection between the first user and the second user, and the like.

In various examples, in response to receiving an approval of the third request, the server 102 may optionally send the second request to the second computing device of the second user, such as that described at operation 806. In such examples, the server 102 may provide the second user the ability to approve or deny the conversation, as described above.

At operation 810, the server 102 determines whether an authorization was received from the second computing device and/or the administrative computing device. The authorization can include an indication of selection of an approve selectable option received from the second computing device and/or the administrative computing device.

Based on a determination that the authorization was received ("Yes" at operation 810), the server 102, at operation 812, generates a channel between the first user and the second user, the channel including the message. The channel can include a communication channel or a direct messaging instance between the first user and the second user. Though described herein as a channel between the first user and the second user, the channel may include additional users, such as based on one or more users to whom the first user includes as intended recipients of the message and/or based on one or more users who are subsequently invited to join the channel. The server 102 can receive messages from computing devices associated with the channel and can provide the messages to the one or more other users of the channel, such as to facilitate communications between the users.

Based on a determination that the authorization was not received ("No" at operation 810), the server 102, at operation 814, causes a notification to be presented via the first computing device, the notification indicating that the communication is not authorized. The server 102 can determine that authorization was not received based on receiving an indication of selection of a deny selectable option by the second user and/or the administrator. In other words, the server 102 can determine that an input associated with the deny selectable option was received from the second computing device and/or the administrative computing device. Based on the input, the server 102 determines that the authorization for the conversation was not received.

The server 102 can generate the notification indicating that the communication is not authorized via an interface of the first computing device. The notification can include a pop-up notification, an automated message presented via a messaging interface, or the like.

As such, techniques described herein provide specific, technical solutions to technical problems faced by existing systems, the details of which are described above.

EXAMPLE CLAUSES

A: A method, implemented at least in part by one or more computing devices of a communication platform, comprising: receiving, from a client associated with a first user of a first organization, a first request to access contact data from a third-party resource, wherein the contact data comprises contact information for a plurality of users associated with a second organization that is different from the first organization; in response to receiving the first request, obtaining the contact data from the third-party resource; receiving, from the client associated with the first user, a second request to compose a message to a second user of the second organization; receiving, from the client, a first input comprising a portion of contact information associated with the second user; in response to receiving the first input, presenting contact information matching the portion of contact information associated with the second user, via a messaging interface associated with the client, wherein the contact information includes data associated with the second user obtained from the contact data.

B: The method of paragraph A, further comprising receiving, from the client, an indication of authorization to access the contact data from the third-party resource, wherein the contact data is obtained based at least in part on the indication of authorization.

C: The method of either paragraph A or paragraph B, wherein the contact data further comprises contact information for at least one user associated with a third organization that is different from the first organization and the second organization.

D: The method of any one of paragraphs A-C, further comprising: receiving, from the client and via the messaging interface, a third request to transmit the message to a second user account of the second user; generating, based at least in part on the third request, a user interface comprising message data associated with the message, the message data comprising: user data associated with the first user; a first option to approve the message; and a second option to deny the message; causing a presentation of the user interface via a second client associated with the second user; and in response to receiving, from the second client, an indication of selection of the first option to approve the message, causing the message to be presented via the second client.

E: The method of any one of paragraphs A-D, wherein presenting the contact data further comprises: automatically populating, via the messaging interface, a recipient user identifier associated with the second user based at least in part on the first input.

F: The method of any one of paragraphs A-E, wherein the third-party resource is a first third-party resource, the contact data is first contact data, and the plurality of users is a first plurality of users, the method further comprising: receiving a third request to access second contact data from a second third-party resource, wherein the second contact data comprises contact information for a second plurality of users associated with one or more organizations that are different from the first organization; and in response to receiving the third request, obtaining the second contact data from the second third-party resource; wherein presenting the contact data comprises presenting at least a first portion of the first contact data or a second portion of the second contact data via the messaging interface.

G: The method of paragraph F, wherein the contact data comprises the first portion of the first contact data and the second portion of the second contact data, the method further comprising: receiving, from the client, a first indication of selection of a first indicator associated with the second user corresponding to the first contact data; receiving, from the client, a second indication of selection of a second indicator associated with a third user corresponding to the second contact data; in response to receiving the first indication of selection of the first indicator and the second indication of selection of the second indicator, generating a direct messaging instance between the first user, the second user, and the third user, wherein the direct messaging instance enables communication between the first user, the second user, and the third user.

H: A computing device comprising: a processor; and a non-transitory computer-readable medium storing instructions that, when executed, cause a processor to perform a computer-implemented method as any one of paragraphs A-G describe.

I: A computing device comprising: a means for processing; and a means for storing coupled to the means for processing, the means for storing including instructions to configure one or more devices to perform a computer-implemented method as any one of paragraphs A-G describe.

J: A system comprising: one or more processors; and one or more computer readable media storing instructions that, when executed, cause the system to perform operations comprising: receiving, from a client associated with a first user of a first organization, a first request to access contact data from a third-party resource, wherein the contact data comprises contact information for a plurality of users associated with a second organization that is different from the first organization; in response to receiving the first request, obtaining the contact data from the third-party resource; receiving, from the client associated with the first user, a second request to compose a message to a second user of the second organization; receiving, from the client, a first input comprising a portion of contact information associated with the second user; in response to receiving the first input, presenting contact information matching the portion of contact information associated with the second user, via a messaging interface associated with the client, wherein the contact information includes data associated with the second user obtained from the contact data.

K: The system of paragraph J, the operations further comprising receiving, from the client, an indication of authorization to access the contact data from the third-party resource, wherein the contact data is obtained based at least in part on the indication of authorization.

L: The system of either paragraph J or paragraph K, wherein the contact data further comprises contact information for at least one user associated with a third organization that is different from the first organization and the second organization.

M: The system of any one of paragraphs J-L, the operations further comprising: receiving, from the client and via the messaging interface, a third request to transmit the message to a second user account of the second user; generating, based at least in part on the third request, a user interface comprising message data associated with the message, the message data comprising: user data associated with the first user; a first option to approve the message; and a second option to deny the message; causing a presentation of the user interface via a second client associated with the second user; and in response to receiving, from the second client, an indication of selection of the first option to approve the message, causing the message to be presented via the second client.

N: The system of any one of paragraphs J-M, wherein presenting the contact data further comprises: automatically populating, via the messaging interface, a recipient user identifier associated with the second user based at least in part on the first input.

O: The system of any one of paragraphs J-N, wherein the third-party resource is a first third-party resource, the contact data is first contact data, and the plurality of users is a first plurality of users, the operations further comprising: receiving a third request to access second contact data from a second third-party resource, wherein the second contact data comprises contact information for a second plurality of users associated with one or more organizations that are different from the first organization; and in response to receiving the third request, obtaining the second contact data from the second third-party resource; wherein presenting the contact data comprises presenting at least a first portion of the first contact data or a second portion of the second contact data via the messaging interface.

P: The system of paragraph O, wherein the contact data comprises the first portion of the first contact data and the second portion of the second contact data, the operations further comprising: receiving, from the client, a first indication of selection of a first indicator associated with the second user corresponding to the first contact data; receiving, from the client, a second indication of selection of a second indicator associated with a third user corresponding to the second contact data; in response to receiving the first indication of selection of the first indicator and the second indication of selection of the second indicator, generating a direct messaging instance between the first user, the second user, and the third user, wherein the direct messaging instance enables communication between the first user, the second user, and the third user.

Q: One or more non-transitory computer-readable media storing computer-executable instructions that, when executed by one or more processors of a computing device associated with a communication platform, cause the computing device to perform operations comprising: receiving, from a client associated with a first user of a first organization, a first request to access contact data from a third-party resource, wherein the contact data comprises contact information for a plurality of users associated with a second organization that is different from the first organization; in response to receiving the first request, obtaining the contact data from the third-party resource; receiving, from the client associated with the first user, a second request to compose a message to a second user of the second organization; receiving, from the client, a first input comprising a portion of contact information associated with the second user; in response to receiving the first input, presenting contact information matching the portion of contact information associated with the second user, via a messaging interface associated with the client, wherein the contact information includes data associated with the second user obtained from the contact data.

R: The one or more non-transitory computer-readable media of paragraph Q, the operations further comprising: receiving, from the client, an indication of authorization to access the contact data from the third-party resource, wherein the contact data is obtained based at least in part on the indication of authorization.

S: The one or more non-transitory computer-readable media of either paragraph Q or paragraph R, wherein the contact data further comprises contact information for at least one user associated with a third organization that is different from the first organization and the second organization.

T: The one or more non-transitory computer-readable media of any one of paragraphs Q-S, the operations further comprising: receiving, from the client and via the messaging interface, a third request to transmit the message to a second user account of the second user; generating, based at least in part on the third request, a user interface comprising message data associated with the message, the message data comprising: user data associated with the first user; a first option to approve the message; and a second option to deny the message; causing a presentation of the user interface via a second client associated with the second user; and in response to receiving, from the second client, an indication of selection of the first option to approve the message, causing the message to be presented via the second client.

U: The one or more non-transitory computer-readable media of any one of paragraphs Q-T, wherein presenting the contact data further comprises: automatically populating, via the messaging interface, a recipient user identifier associated with the second user based at least in part on the first input.

V: The one or more non-transitory computer-readable media of any one of paragraphs Q-U, wherein the third-party resource is a first third-party resource, the contact data is first contact data, and the plurality of users is a first plurality of users, the operations further comprising: receiving a third request to access second contact data from a second third-party resource, wherein the second contact data comprises contact information for a second plurality of users associated with one or more organizations that are different from the first organization; and in response to receiving the third request, obtaining the second contact data from the second third-party resource; wherein presenting the contact data comprises presenting at least a first portion of the first contact data or a second portion of the second contact data via the messaging interface.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, comprising:
    sending, via the communication platform, a first request to access contact data from a third-party resource, wherein the contact data comprises contact information for a plurality of users;
    sending, via the communication platform and based on passage of a period of time, a second request to access updated contact data from the third-party resource;
    receiving, from a client associated with a first user account of a first user of a first organization and via a user interface associated with the communication platform, a first authorization to access the contact data from the third-party resource;
    receiving, from the client associated with the first user, a third request to compose a message to a second user associated with a second organization that is different from the first organization;
    receiving, from the client, a first input comprising a portion of contact information associated with the second user, the first input being provided by the first user to the message;
    identifying, by the communication platform and based at least in part on the portion of contact information, a plurality of potential intended users that are associated with the portion of contact information;
    determining, by the communication platform and based at least in part on receiving the first input, that the portion of contact information is not stored in association with a contact list of the first user account of the communication platform;
    accessing, based at least in part on the portion of contact information not being stored in association with the first user account, by the communication platform, from the third-party resource, and based at least in part on the first authorization, the contact information matching the portion of contact information associated with the second user; and
    presenting, via a messaging interface associated with the client, a first group of contacts stored by a first third-party service provider and a second group of contacts stored by a second third-party service provider different than the first third-party service provider, the first group of contacts and the second group of contacts including the contact information matching the portion of contact information associated with the second user, the first group of contacts associated with a first indicator indicating the contact information was obtained from the first third-party service provider and the second group of contacts associated with a second indicator different than the first indicator indicating the second group of contacts is associated with the second third-party service provider.

2. The method of claim 1, further comprising:
    receiving, from the client and in association with the first authorization, a token configured to enable access to the contact data from the third-party resource,
    wherein the contact data is obtained based at least in part on the token.

3. The method of claim 1, wherein the contact data further comprises second contact information for at least one user associated with a third organization that is different from the first organization and the second organization.

4. The method of claim 1, further comprising:
    receiving, from the client and via the messaging interface, a fourth request to transmit the message to a second user account of the second user;
    generating, based at least in part on the fourth request, a user interface comprising message data associated with the message, the message data comprising:
        user data associated with the first user;
        a first option to approve the message; and
        a second option to deny the message;
    causing a presentation of the user interface via a second client associated with the second user; and
    in response to receiving, from the second client, an indication of selection of the first option to approve the message, causing the message to be presented via the second client.

5. The method of claim 1, wherein presenting the contact data further comprises:
    automatically populating, via the messaging interface, a recipient user identifier associated with the second user based at least in part on the first input.

6. The method of claim 1, wherein the third-party resource is a first third-party resource, the contact data is first contact data, and the plurality of users is a first plurality of users, the method further comprising:
    receiving a fourth request to access second contact data from a second third-party resource, wherein the second contact data comprises second contact information for a second plurality of users associated with one or more organizations that are different from the first organization; and in response to receiving the fourth request, obtaining the second contact data from the second third-party resource;

wherein presenting the contact data comprises presenting at least a first portion of the first contact data or a second portion of the second contact data via the messaging interface.

7. The method of claim 6, wherein the contact data comprises the first portion of the first contact data and the second portion of the second contact data, the method further comprising:

receiving, from the client, a first indication of selection of a first indicator associated with the second user corresponding to the first contact data;

receiving, from the client, a second indication of selection of a second indicator associated with a third user corresponding to the second contact data; and in response to receiving the first indication of selection of the first indicator and the second indication of selection of the second indicator, generating a direct messaging instance between the first user, the second user, and the third user, wherein the direct messaging instance enables communication between the first user, the second user, and the third user.

8. A system comprising:

one or more processors; and one or more computer readable media storing instructions that, when executed, cause the system to perform operations comprising:

sending, via a communication platform, a first request to access contact data from a third-party resource, wherein the contact data comprises contact information for a plurality of users;

sending, via the communication platform and based on passage of a period of time, a second request to access updated contact data from the third-party resource;

receiving, from a client associated with a first user account of a first user of a first organization and via a user interface associated with a communication platform, a first authorization to access the contact data from the third-party resource;

receiving, from the client associated with the first user, a third request to compose a message to a second user associated with a second organization that is different from the first organization;

receiving, from the client, a first input comprising a portion of contact information associated with the second user, the first input being provided by the first user to the message;

identifying, by the communication platform and based at least in part on the portion of contact information, a plurality of potential intended users that are associated with the portion of contact information;

determining, by the communication platform and based at least in part on receiving the first input, that the portion of contact information is not stored in association with a contact list of the first user account of the communication platform;

accessing, based at least in part on the portion of contact information not being stored in association with the first user account, by the communication platform, from the third-party resource, and based at least in part on the first authorization, the contact information matching the portion of contact information associated with the second user; and presenting, via a messaging interface associated with the client, a first group of contacts stored by a first third-party service provider and a second group of contacts stored by a second third-party service provider different than the first third-party service provider, the first group of contacts and the second group of contacts including the contact information matching the portion of contact information associated with the second user, the first group of contacts associated with a first indicator indicating the contact information was obtained from the first third-party service provider and the second group of contacts associated with a second indicator different than the first indicator indicating the second group of contacts is associated with the second third-party service provider.

9. The system of claim 8, the operations further comprising:

receiving, from the client, and in association with the first authorization, a token configured to enable access to the contact data from the third-party resource, wherein the contact data is obtained based at least in part on the token.

10. The system of claim 8, wherein the contact data further comprises second contact information for at least one user associated with a third organization that is different from the first organization and the second organization.

11. The system of claim 8, the operations further comprising:

receiving, from the client and via the messaging interface, a fourth request to transmit the message to a second user account of the second user;

generating, based at least in part on the fourth request, a user interface comprising message data associated with the message, the message data comprising:

user data associated with the first user;

a first option to approve the message; and a second option to deny the message;

causing a presentation of the user interface via a second client associated with the second user; and in response to receiving, from the second client, an indication of selection of the first option to approve the message, causing the message to be presented via the second client.

12. The system of claim 8, wherein presenting the contact data further comprises:

automatically populating, via the messaging interface, a recipient user identifier associated with the second user based at least in part on the first input.

13. The system of claim 8, wherein the third-party resource is a first third-party resource, the contact data is first contact data, and the plurality of users is a first plurality of users, the operations further comprising:

receiving a fourth request to access second contact data from a second third-party resource, wherein the second contact data comprises second contact information for a second plurality of users associated with one or more organizations that are different from the first organization; and in response to receiving the fourth request, obtaining the second contact data from the second third-party resource;

wherein presenting the contact data comprises presenting at least a first portion of the first contact data or a second portion of the second contact data via the messaging interface.

14. The system of claim 13, wherein the contact data comprises the first portion of the first contact data and the second portion of the second contact data, the operations further comprising:
receiving, from the client, a first indication of selection of a first indicator associated with the second user corresponding to the first contact data;
receiving, from the client, a second indication of selection of a second indicator associated with a third user corresponding to the second contact data; and
in response to receiving the first indication of selection of the first indicator and the second indication of selection of the second indicator, generating a direct messaging instance between the first user, the second user, and the third user, wherein the direct messaging instance enables communication between the first user, the second user, and the third user.

15. One or more non-transitory computer-readable media storing computer-executable instructions that, when executed by one or more processors of a computing device associated with a communication platform, cause the computing device to perform operations comprising:
sending, via the communication platform, a first request to access contact data from a third-party resource, wherein the contact data comprises contact information for a plurality of users;
sending, via the communication platform and based on passage of a period of time, a second request to access updated contact data from the third-party resource;
receiving, from a client associated with a first user account of a first user of a first organization and via a user interface associated with the communication platform, a first authorization to access the contact data from the third-party resource;
receiving, from the client associated with the first user, a third request to compose a message to a second user associated with a second organization that is different from the first organization;
receiving, from the client, a first input comprising a portion of contact information associated with the second user, the first input being provided by the first user to the message;
identifying, by the communication platform and based at least in part on the portion of contact information, a plurality of potential intended users that are associated with the portion of contact information;
determining, by the communication platform and based at least in part on receiving the first input, that the portion of contact information is not stored in association with a contact list of the first user account of the communication platform;
accessing, based at least in part on the portion of contact information not being stored in association with the first user account, by the communication platform, from the third-party resource, and based at least in part on the first authorization, the contact information matching the portion of contact information associated with the second user; and
presenting, via a messaging interface associated with the client, a first group of contacts stored by a first third-party service provider and a second group of contacts stored by a second third-party service provider different than the first third-party service provider, the first group of contacts and the second group of contacts including the contact information matching the portion of contact information associated with the second user, the first group of contacts associated with a first indicator indicating the contact information was obtained from the first third-party service provider and the second group of contacts associated with a second indicator different than the first indicator indicating the second group of contacts is associated with the second third-party service provider.

16. The one or more non-transitory computer-readable media of claim 15, the operations further comprising:
receiving, from the client, and in association with the first authorization, a token configured to enable access to the contact data from the third-party resource,
wherein the contact data is obtained based at least in part on the token.

17. The one or more non-transitory computer-readable media of claim 15, wherein the contact data further comprises second contact information for at least one user associated with a third organization that is different from the first organization and the second organization.

18. The one or more non-transitory computer-readable media of claim 15, the operations further comprising:
receiving, from the client and via the messaging interface, a fourth request to transmit the message to a second user account of the second user;
generating, based at least in part on the fourth request, a user interface comprising message data associated with the message, the message data comprising:
user data associated with the first user;
a first option to approve the message; and
a second option to deny the message;
causing a presentation of the user interface via a second client associated with the second user; and
in response to receiving, from the second client, an indication of selection of the first option to approve the message, causing the message to be presented via the second client.

19. The one or more non-transitory computer-readable media of claim 15, wherein presenting the contact data further comprises:
automatically populating, via the messaging interface, a recipient user identifier associated with the second user based at least in part on the first input.

20. The one or more non-transitory computer-readable media of claim 15, wherein the third-party resource is a first third-party resource, the contact data is first contact data, and the plurality of users is a first plurality of users, the operations further comprising:
receiving a fourth request to access second contact data from a second third-party resource, wherein the second contact data comprises second contact information for a second plurality of users associated with one or more organizations that are different from the first organization; and
in response to receiving the fourth request, obtaining the second contact data from the second third-party resource; wherein presenting the contact data comprises presenting at least a first portion of the first contact data or a second portion of the second contact data via the messaging interface.

* * * * *